US012586574B2

(12) United States Patent
Kim et al.

(10) Patent No.: US 12,586,574 B2
(45) Date of Patent: Mar. 24, 2026

(54) ELECTRONIC DEVICE FOR PROCESSING UTTERANCE, OPERATING METHOD THEREOF, AND STORAGE MEDIUM

(71) Applicant: SAMSUNG ELECTRONICS CO., LTD., Suwon-si (KR)

(72) Inventors: JeongYeol Kim, Suwon-si (KR); Kyungtae Kim, Suwon-si (KR); Gajin Song, Suwon-si (KR); Hoseon Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 18/510,086

(22) Filed: Nov. 15, 2023

(65) Prior Publication Data

US 2024/0161738 A1     May 16, 2024

Related U.S. Application Data

(63) Continuation of application No. PCT/KR2023/018283, filed on Nov. 14, 2023.

(30) Foreign Application Priority Data

Nov. 15, 2022    (KR) ........................ 10-2022-0152322
Dec. 21, 2022    (KR) ........................ 10-2022-0180186

(51) Int. Cl.
*G10L 15/08*          (2006.01)
*G06F 40/295*        (2020.01)
              (Continued)

(52) U.S. Cl.
CPC ........ *G10L 15/1815* (2013.01); *G06F 40/295* (2020.01); *G06F 40/30* (2020.01);
              (Continued)

(58) Field of Classification Search
None
See application file for complete search history.

(56) References Cited

U.S. PATENT DOCUMENTS 7,493,257 B2 *    2/2009    Kim ........................ G10L 15/22
                                                                      704/275
9,922,642 B2 *    3/2018    Pitschel ................ G10L 15/063
                          (Continued)

FOREIGN PATENT DOCUMENTS

JP          2000-29490 A        1/2000
JP            3577725 B2       10/2004
                    (Continued)

OTHER PUBLICATIONS

International Search Report dated Feb. 14, 2024, issued by the International Searching Authority in International Application No. PCT/KR2023/018283.
(Continued)

*Primary Examiner* — Richard Z Zhu
(74) *Attorney, Agent, or Firm* — Sughrue Mion, PLLC

(57)              ABSTRACT

An electronic device includes a microphone, a memory and at least one processor. The at least one processor is configured to acquire utterance data corresponding to a voice of a user through the microphone, determine an intent and provide content to the user based on the intent. When intent determination fails, then one or more models are updated using text obtained from the utterance data. The intent determination may fail when there is no verb (predicate) in the user utterance. The models are updated by searching for named entities and determining domains to be used for the model updates. The domains are determined based on categories. The categories are found using a named entity search (NES). Examples of categories are music artists,
(Continued)

music albums, movie titles, TV program channels, video clip channels, radio programs, and podcast titles.

20 Claims, 16 Drawing Sheets

(51) Int. Cl.

| | |
|---|---|
| *G06F 40/30* | (2020.01) |
| *G10L 15/18* | (2013.01) |
| *G10L 15/183* | (2013.01) |
| G06F 40/211 | (2020.01) |
| G06F 40/279 | (2020.01) |
| G06F 40/284 | (2020.01) |
| G10L 15/22 | (2006.01) |

(52) U.S. Cl.
CPC ........ *G10L 15/1822* (2013.01); *G10L 15/183* (2013.01); *G06F 40/211* (2020.01); *G06F 40/279* (2020.01); *G06F 40/284* (2020.01); *G10L 15/22* (2013.01)

(56) References Cited

U.S. PATENT DOCUMENTS

| | | | | |
|---|---|---|---|---|
| 11,302,330 B2 * | 4/2022 | Ge | .................... | G10L 15/1815 |
| 11,380,330 B2 * | 7/2022 | Kahan | ................ | G10L 15/1815 |
| 11,410,657 B2 * | 8/2022 | Kim | ....................... | G06F 40/58 |
| 2015/0243281 A1 | 8/2015 | Song et al. | | |

| | | | | |
|---|---|---|---|---|
| 2018/0174578 A1 * | 6/2018 | Bangalore | ............ | G06F 40/137 |
| 2019/0304450 A1 | 10/2019 | Kwon | | |
| 2019/0371296 A1 | 12/2019 | Iwase et al. | | |
| 2020/0013407 A1 | 1/2020 | Chae | | |
| 2020/0035244 A1 * | 1/2020 | Kim | ....................... | G06F 40/30 |
| 2020/0279002 A1 | 9/2020 | Kim et al. | | |
| 2020/0380077 A1 * | 12/2020 | Ge | .......................... | G10L 15/18 |
| 2020/0380991 A1 * | 12/2020 | Ge | .......................... | G10L 15/18 |
| 2021/0027785 A1 * | 1/2021 | Kahan | .................. | G06F 16/433 |
| 2022/0020358 A1 | 1/2022 | Song et al. | | |
| 2022/0139390 A1 | 5/2022 | Park | | |

FOREIGN PATENT DOCUMENTS

| | | |
|---|---|---|
| JP | 3937909 B2 | 6/2007 |
| KR | 10-2015-0054045 A | 5/2015 |
| KR | 10-2016-0084059 A | 7/2016 |
| KR | 10-2018-0138513 A | 12/2018 |
| KR | 10-2019-0107289 A | 9/2019 |
| KR | 10-2020-0106126 A | 9/2020 |
| KR | 10-2021-0001082 A | 1/2021 |
| KR | 10-2225001 B1 | 3/2021 |
| KR | 10-2022-0059629 A | 5/2022 |
| WO | 2019/142427 A1 | 7/2019 |

OTHER PUBLICATIONS

Written Opinion dated Feb. 14, 2024, issued by the International Searching Authority in International Application No. PCT/KR2023/018283.

\* cited by examiner

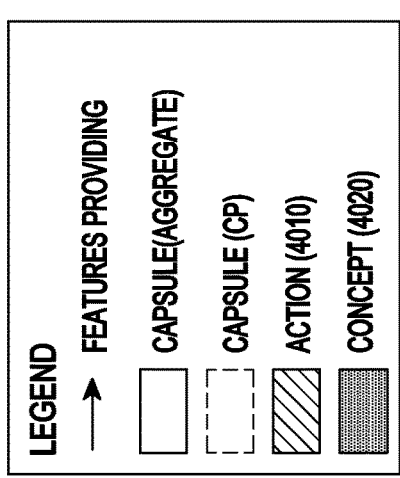
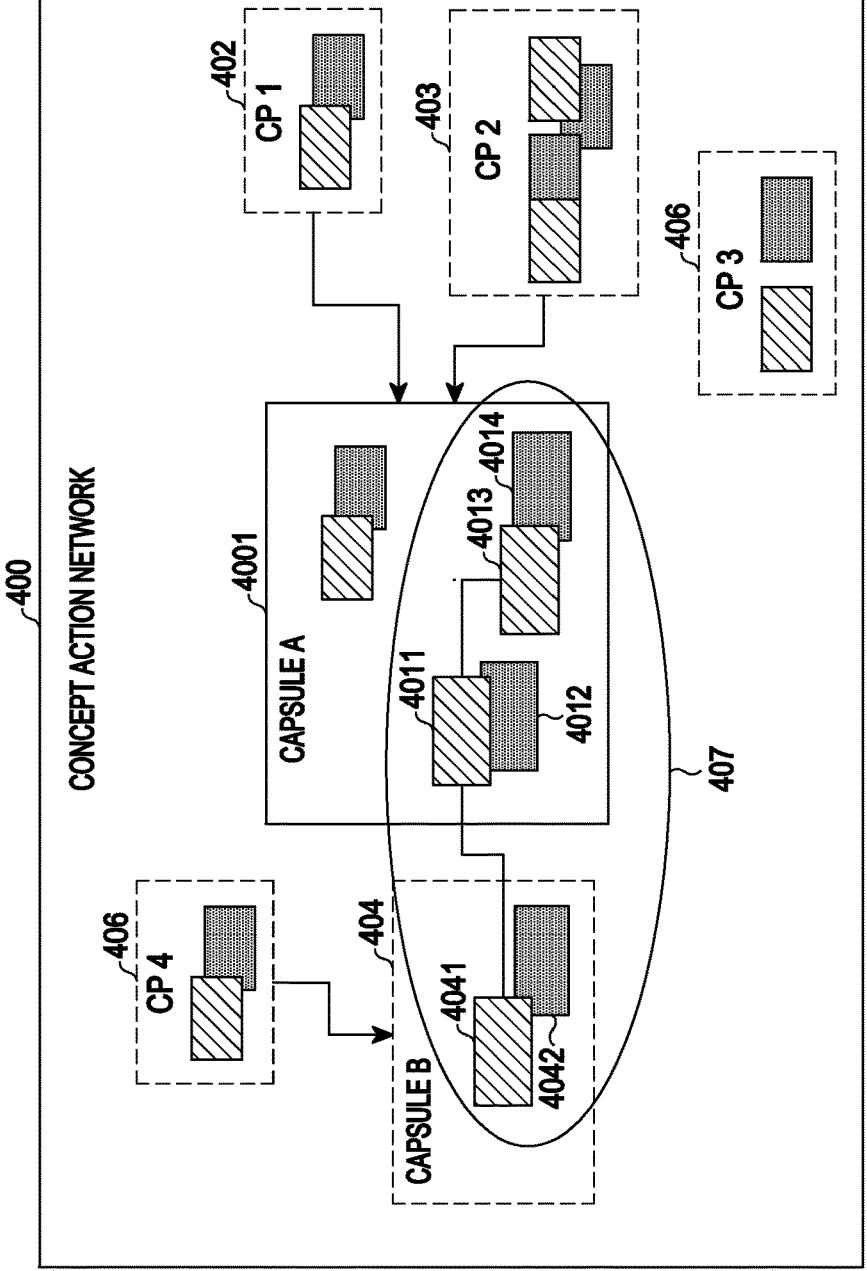
FIG. 3

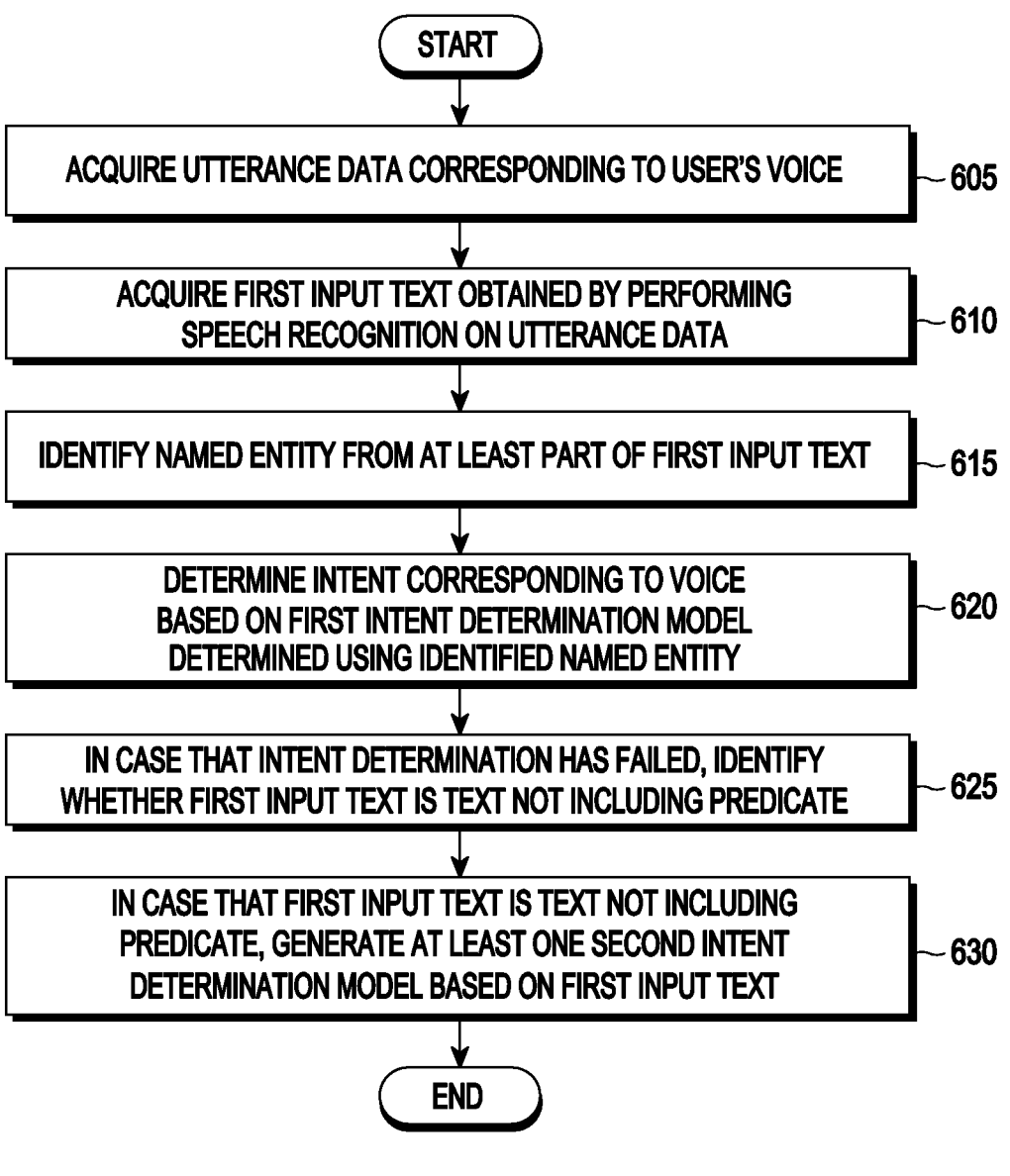

START

ACQUIRE UTTERANCE DATA CORRESPONDING TO USER'S VOICE — 605

ACQUIRE FIRST INPUT TEXT OBTAINED BY PERFORMING
SPEECH RECOGNITION ON UTTERANCE DATA — 610

IDENTIFY NAMED ENTITY FROM AT LEAST PART OF FIRST INPUT TEXT — 615

DETERMINE INTENT CORRESPONDING TO VOICE
BASED ON FIRST INTENT DETERMINATION MODEL
DETERMINED USING IDENTIFIED NAMED ENTITY — 620

IN CASE THAT INTENT DETERMINATION HAS FAILED, IDENTIFY
WHETHER FIRST INPUT TEXT IS TEXT NOT INCLUDING PREDICATE — 625

IN CASE THAT FIRST INPUT TEXT IS TEXT NOT INCLUDING
PREDICATE, GENERATE AT LEAST ONE SECOND INTENT
DETERMINATION MODEL BASED ON FIRST INPUT TEXT — 630

END

FIG. 6

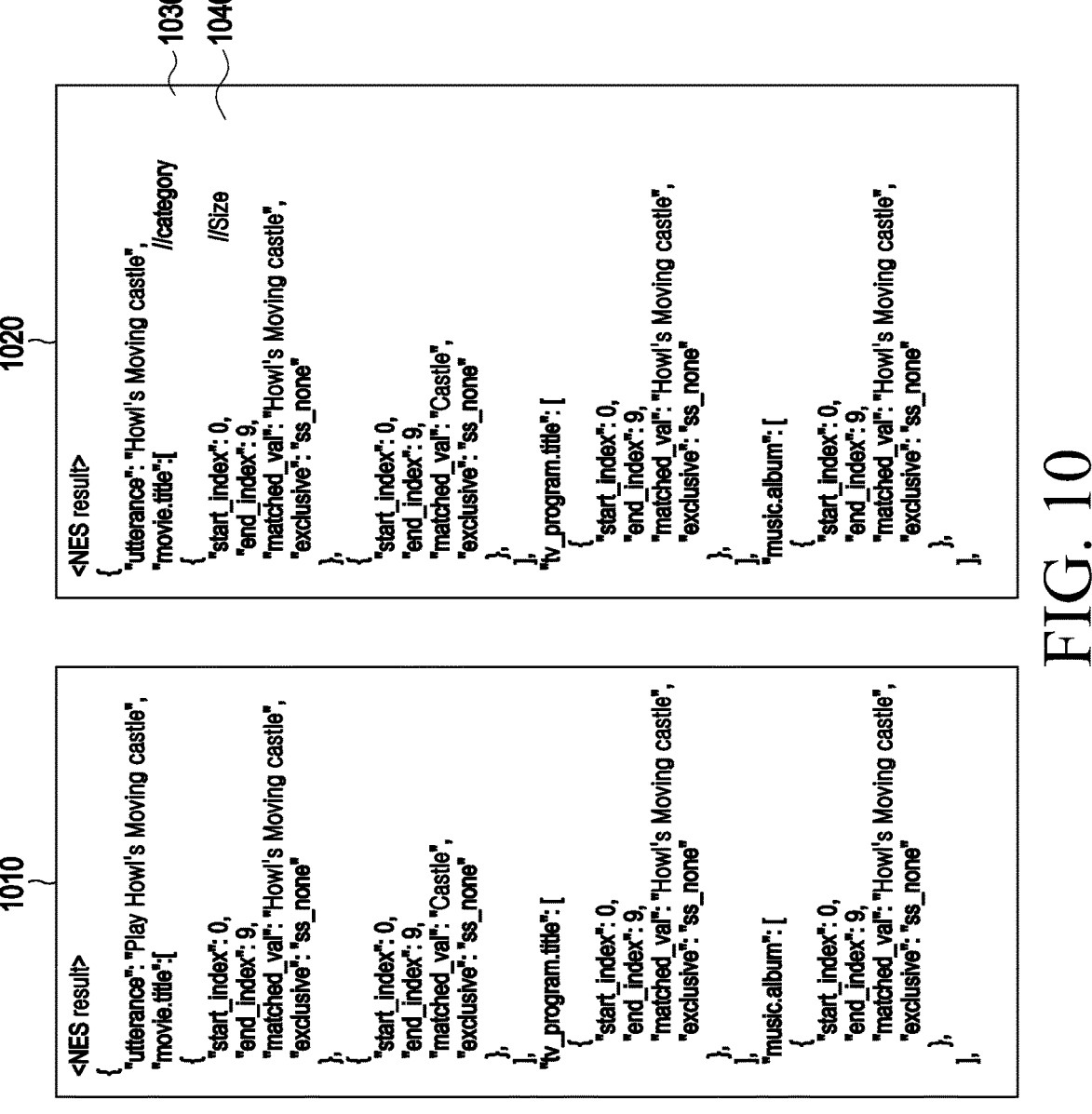

1020

1030
1040

<NES result>
{
 "utterance": "Howl's Moving castle",
 "movie.title": [                          //category
   {
     "start_index": 0,                     //Size
     "end_index": 9,
     "matched_val": "Howl's Moving castle",
     "exclusive": "ss_none"
   },
   {
     "start_index": 0,
     "end_index": 9,
     "matched_val": "Castle",
     "exclusive": "ss_none"
   },
 "tv_program.title": [
   {
     "start_index": 0,
     "end_index": 9,
     "matched_val": "Howl's Moving castle",
     "exclusive": "ss_none"
   },
 "music.album": [
   {
     "start_index": 0,
     "end_index": 9,
     "matched_val": "Howl's Moving castle",
     "exclusive": "ss_none"
   },
 },

1010

<NES result>
{
 "utterance": "Play Howl's Moving castle",
 "movie.title": [
   {
     "start_index": 0,
     "end_index": 9,
     "matched_val": "Howl's Moving castle",
     "exclusive": "ss_none"
   },
   {
     "start_index": 0,
     "end_index": 9,
     "matched_val": "Castle",
     "exclusive": "ss_none"
   },
 "tv_program.title": [
   {
     "start_index": 0,
     "end_index": 9,
     "matched_val": "Howl's Moving castle",
     "exclusive": "ss_none"
   },
 "music.album": [
   {
     "start_index": 0,
     "end_index": 9,
     "matched_val": "Howl's Moving castle",
     "exclusive": "ss_none"
   },
 },

Figure 11:
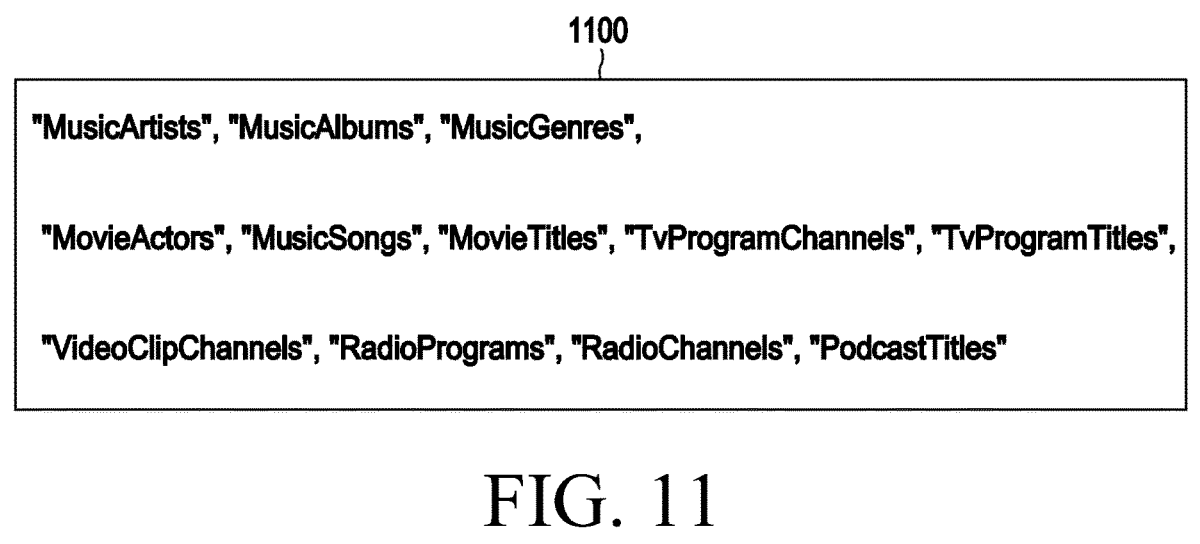

"MusicArtists", "MusicAlbums", "MusicGenres",

"MovieActors", "MusicSongs", "MovieTitles", "TvProgramChannels", "TvProgramTitles", "VideoClipChannels", "RadioPrograms", "RadioChannels", "PodcastTitles"

{"categoryToDomain":{["movie.title":"TV IC","tv_program.title:TV IC"]},

"parameterName":"Program", "Utterance":"Howl's Moving Castle"}

1240

1600

ELECTRONIC DEVICE FOR PROCESSING UTTERANCE, OPERATING METHOD THEREOF, AND STORAGE MEDIUM

CROSS-REFERENCE TO RELATED APPLICATIONS

This is a continuation of international application PCT/KR2023/018283 filed on Nov. 14, 2023. The present application also claims priority to Korean Patent Application No.: 10-2022-0152322 filed on Nov. 15, 2022 and Korean Patent Application No.: 10-2022-0180186 filed on Dec. 21, 2022. The above applications are hereby incorporated by reference.

TECHNICAL FIELD

An embodiment disclosed in this document relates to an electronic device for processing an utterance, an operating method thereof, and a storage medium.

BACKGROUND ART

Various services and additional functions provided through an electronic device such as a smartphone are gradually increasing. In order to increase the effective value of the electronic device and satisfy various needs of users, communication service providers or electronic device manufacturers are competitively developing electronic devices to provide various functions and to differentiate themselves from other companies. Accordingly, various functions provided through electronic devices are becoming increasingly sophisticated. Recently, various types of intelligence services for electronic devices have been provided, and a speech recognition service corresponding to one of these intelligence services may provide various services to users by controlling electronic devices through speech recognition.

An electronic device may be implemented with technologies for recognizing and analyzing human language (e.g., automatic speech recognition, natural language understanding, natural language generation, machine translation, dialogue system, question and answer, speech recognition/synthesis) in order to provide speech recognition services. In order to provide high-quality speech recognition services to consumers, a technology that accurately identifies a user's intent from a user's voice and a technology that provides an appropriate content service corresponding to the identified user's intent is required.

A technical problem may occur when a user's utterance does not include a verb (predicate) and the user's utterance passes through various processing and arrives at a result, such as a classification result, which does not match the user's intent. This is a failure to determine intent. The wrong content may then be provided to the user due to the technical problem in the processing and models.

DETAILED DESCRIPTION

Technical Solution

A technical solution is provided by embodiments. When a user's utterance does not include a verb (predicate) and the user's utterance passes through various processing, the failure of not matching the user's intent is detected. The user's utterance corresponding to the failure is processed using categories and domains to identify models to be updated or replaced. This process changes the computer machine represented by the models and improves determination of user intent. The proper delivery of desired content to the user is then improved, even when the user's utterance is irregular and does not include a verb.

According to an embodiment, an electronic device (101) may include a microphone (295, 550), a processor (120, 292, 520), and memory (130, 299, 530) storing instructions. According to an embodiment, the instructions that, when executed by the processor may be configured to cause the electronic device to acquire utterance data corresponding to a voice of a user through the microphone. According to an embodiment, the instructions may be configured to cause the electronic device to acquire first input text by speech recognition applied to the utterance data. According to an embodiment, the instructions may be configured to cause the electronic device to identify a named entity based on the first input text. According to an embodiment, the instructions may be configured to cause the electronic device to determine, based on the utterance data and using the named entity and a first intent determination model, an intent. According to an embodiment, the instructions may be configured to cause the electronic device to detect that the intent determination has resulted in a failure. According to an embodiment, the instructions may be configured to cause the electronic device to, responsive to the failure, identify whether the first input text is a text not including a predicate. According to an embodiment, the instructions may be configured to cause the electronic device to, based on the first input text not including the predicate, generate one or more second intent determination models based on the first input text.

Also provided herein is a method for processing an utterance in an electronic device, the method including: acquiring utterance data corresponding to a voice of a user through a microphone of the electronic device; acquiring first input text by speech recognition applied to the utterance data; identifying a named entity based on the first input text; determining, based on the utterance data and using the named entity and a first intent determination model, an intent; detecting that the intent determination has resulted in a failure; responsive to the failure, identifying whether the first input text is a text not including a predicate; and based on the first input text not including the predicate, generating one or more second intent determination models based on the first input text.

A non-volatile storage medium storing instructions storing instructions, wherein the instructions are configured to, when executed by a processor of an electronic device, cause the electronic device to perform at least one operation, the at least one operation including: acquiring utterance data corresponding to a voice of a user through a microphone of the electronic device; acquiring first input text by applying speech recognition on the utterance data; identifying a named entity based on the first input text; determining, based on the utterance data and using the named entity and a first intent determination model, an intent; detecting that the intent determination has resulted in a failure; responsive to the failure, identifying whether the first input text is a text not including a predicate; and based on the first input text not including the predicate, generating one or more second intent determination models based on the first input text.

BRIEF DESCRIPTION OF DRAWINGS

FIG. 3 illustrates a form in which relationship information between concepts and actions is stored in a database according to an embodiment;

FIG. 6 is a flowchart illustrating an operation in an electronic device for processing an utterance according to an embodiment;

FIG. 10 illustrates a method for identifying content utterance text without a predicate according to an embodiment;

FIG. 11 illustrates an example of a category for classifying content utterance text according to an embodiment;

In connection with the description of the drawings, the same or similar reference numerals may be used for the same or similar elements.

DETAILED DESCRIPTION

Figure 1:
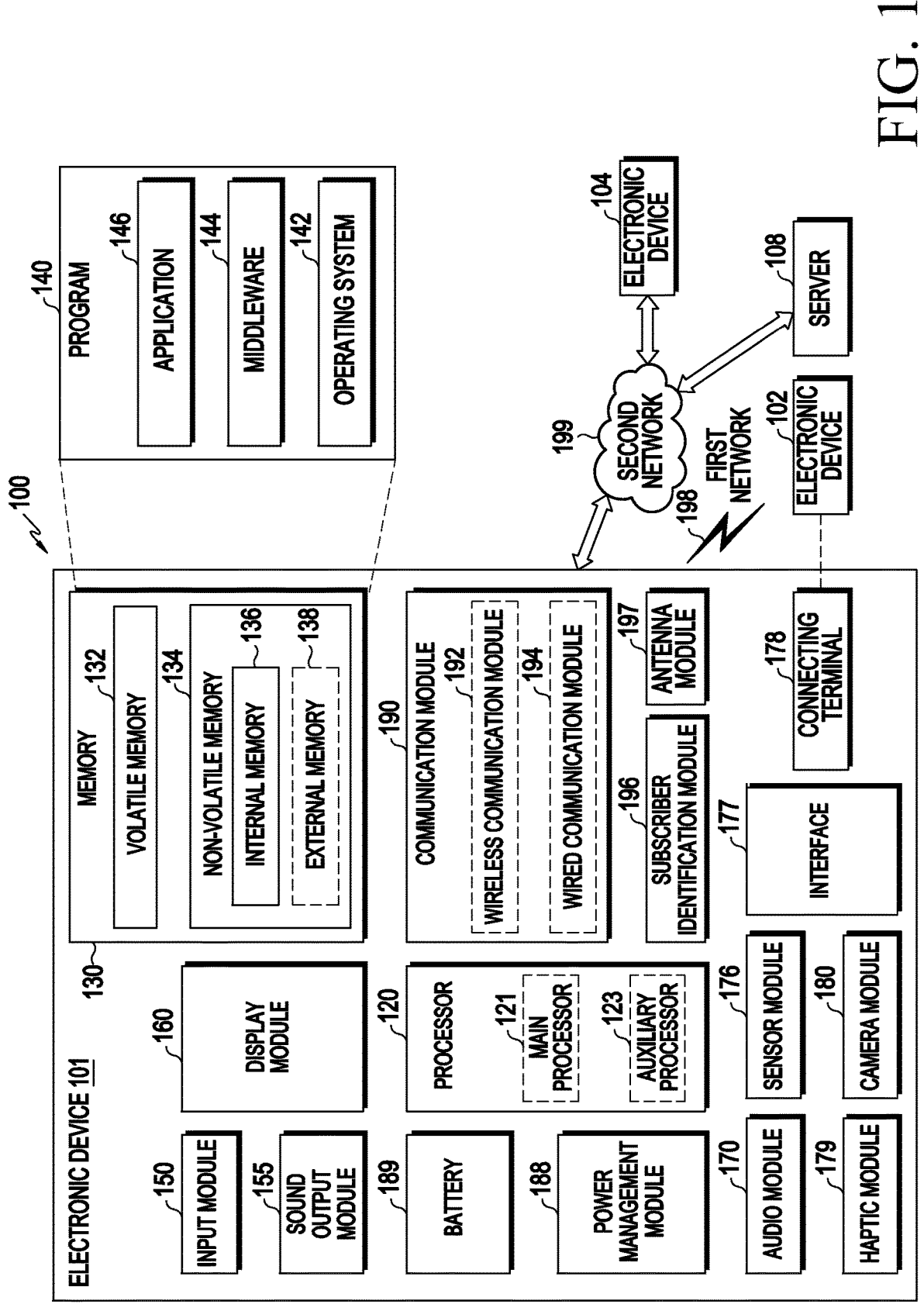
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
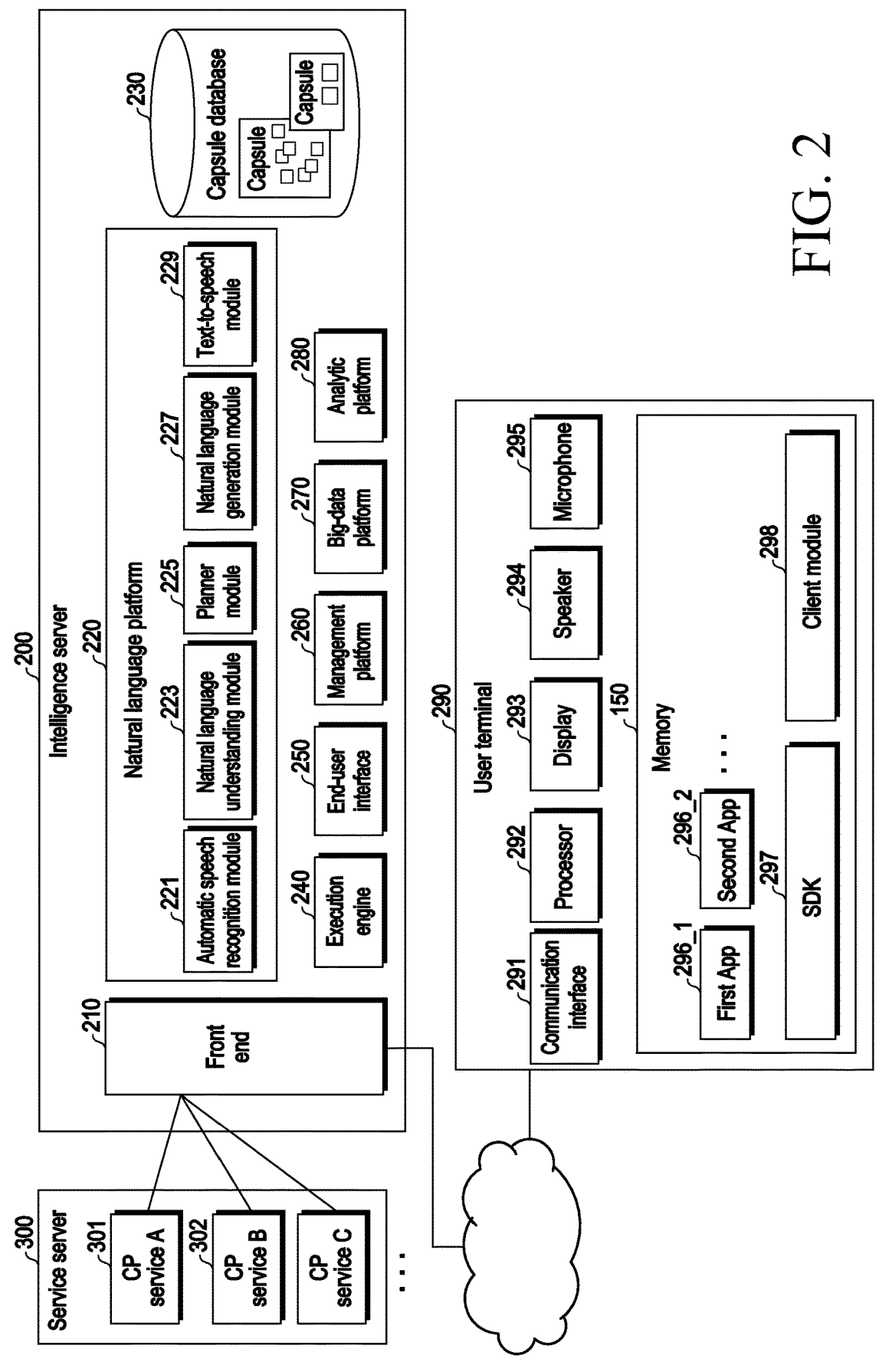
FIG. 2 is a block diagram illustrating an integrated intelligence system according to an embodiment.

FIG. 2 is a block diagram illustrating an integrated intelligence system according to an embodiment.

Referring to FIG. 2, the integrated intelligent system according to an embodiment may include a user terminal 290, an intelligent server 200, and a service server 300.

The user terminal 290 according to an embodiment may be a terminal device (or electronic device) capable of being connected to the Internet, and may be, for example, a mobile phone, a smartphone, a personal digital assistant (PDA), a laptop computer, a TV, white goods, a wearable device, HMD, or smart speaker.

According to the illustrated embodiment, the user terminal 290 may include a communication interface 291, a microphone 295, a speaker 294, a display 293, a memory 299, or a processor 292. The elements listed above may be operatively or electrically connected to each other.

The communication interface 291 according to an embodiment may be configured to be connected to an external device so as to transmit/receive data. The microphone 295 according to an embodiment may receive sound (e.g., a user utterance) and convert the received sound into an electrical signal. The speaker 294 according to an embodiment may output the electrical signal as a sound (e.g., voice). The display 293 according to an embodiment may be configured to display an image or video. The display 293 according to an embodiment may also display a graphical user interface (GUI) of an app (or application program) being executed.

The memory 299 according to an embodiment may store a client module 298, a software development kit (SDK) 297, and a plurality of apps 296. The client module 298 and the SDK 297 may constitute a framework (or a solution program) for performing general-purposed functions. In addition, the client module 298 or the SDK 297 may constitute a framework for processing voice input.

The plurality of apps 296 of the memory 299 according to an embodiment may be a program for performing designated functions. According to an embodiment, the plurality of apps 296 may include a first app 296_1 and a second app 296_2. According to an embodiment, each of the plurality of apps 296 may include plurality of actions for performing a designated function. For example, the apps may include an alarm app, a message app, and/or a schedule app. According to an embodiment, the plurality of apps 296 may be executed by the processor 292 to sequentially execute at least part of the plurality of actions.

The processor 292 according to an embodiment may control an overall operation of the user terminal 290. For example, the processor 292 may be electrically connected to the communication interface 291, the microphone 295, the speaker 294, and the display 293 to perform a designated action.

The processor 292 according to an embodiment may also execute a program stored in the memory 299 to perform a designated function. For example, the processor 292 may execute at least one of the client module 298 or the SDK 297 to perform the following action for processing a voice input. The processor 292 may control the action of the plurality of apps 296 through the SDK 297, for example. The following actions described as actions of the client module 298 or the SDK 297 may be actions performed by the execution of the processor 292.

The client module 298 according to an embodiment may receive voice input. For example, the client module 298 may receive a voice signal corresponding to a user utterance sensed through the microphone 295. The client module 298 may transmit the received voice input to the intelligent server 200. The client module 298 may transmit state information of the user terminal 290 to the intelligent server 200 along with the received voice input. The state information may be, for example, execution state information of an app.

The client module 298 according to an embodiment may receive a result corresponding to the received voice input. For example, the client module 298 may receive a result corresponding to the received voice input in case that the intelligent server 200 is capable of calculating the result corresponding to the received voice input. The client module 298 may display the received result on the display 293.

The client module 298 according to an embodiment may receive a plan corresponding to the received voice input. The client module 298 may display, on the display 293, a result obtained by executing plurality of actions of the app according to a plan. The client module 298 may sequentially display, for example, the execution results of plurality of actions on the display 293. For another example, the user terminal 290 may display, on the display 293, only a part of results obtained by executing plurality of actions (e.g., the result of the last action).

According to an embodiment, the client module 298 may receive, from the intelligent server 200, a request for obtaining information required to calculate a result corresponding to a voice input. According to an embodiment, the client module 298 may transmit the required information to the intelligent server 200 in response to the request.

The client module 298 according to an embodiment may transmit information about a result obtained by executing plurality of actions according to a plan to the intelligent server 200. The intelligent server 200 may identify that the received voice input has been correctly processed, by using the result information.

The client module 298 according to an embodiment may include a speech recognition module. According to an embodiment, the client module 298 may recognize a voice input to perform a limited function, through the speech recognition module. For example, the client module 298 may execute an intelligent app that processes voice input for performing an organic action, via a designated input (e.g., wake up!).

The intelligent server 200 according to an embodiment may receive information associated with a user's voice input from the user terminal 290 through a communication network. According to an embodiment, the intelligent server 200 may change data associated with the received voice input to text data. According to an embodiment, the intelligent server 200 may generate a plan for performing a task corresponding to a user voice input. based on the text data.

According to an embodiment, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the plan may be selected from a set of predefined plans, or may be generated in real time in response to a user request. For example, The AI system may select at least one of plurality of predefined plans.

An embodiment of the intelligent server 200 may transmit a result according to the generated plan to the user terminal 290, or may transmit the generated plan to the user terminal 290. According to an embodiment, the user terminal 290 may display the result according to the plan on the display 293. According to an embodiment, the user terminal 290 may display on the display 293 a result obtained by executing the action according to the plan.

The intelligence server 200 according to an embodiment may include a front end 210, a natural language platform 220, a capsule database (DB) 230, an execution engine 240, an end UI 250, a management platform 260, a big data platform 270, or an analytic platform 280.

According to an embodiment, the front end 210 may receive a voice input received from the user terminal 290. The front end 210 may transmit a response corresponding to the voice input.

According to an embodiment, the natural language platform 220 may include an automatic speech recognition (ASR) module 221, a natural language understanding module (NLU module) 223, a planner module 225, a natural language generator module (NLG module) 227, or a text to speech module (TTS module) 229.

According to an embodiment, the ASR module 221 may convert the voice input received from the user terminal 290 into text data. According to an embodiment, the NLU module 223 may grasp the intent of the user by using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements), such as morphemes or phrases, and may determine the intent of the user by matching the grasped meaning of the words to the intent.

According to an embodiment, the planner module 225 may generate the plan by using the intent and a parameter, which are determined by the NLU module 223. According to an embodiment, the planner module 225 may determine a plurality of domains required to perform a task, based on the determined intent. The planner module 225 may determine a plurality of actions included in each of the plurality of domains determined based on the intent. According to an embodiment, the planner module 225 may determine a parameter required to perform the determined plurality of actions or a result value output by the execution of the plurality of actions. The parameter and the result value may be defined as a concept of the designated form (or class). Accordingly, the plan may include the plurality of actions and a plurality of concepts determined by the intent of the user. The planner module 225 may determine the relationship between the plurality of actions and the plurality of concepts stepwise (or hierarchically). For example, the planner module 225 may determine the execution sequence of the plurality of actions, which are determined based on the user's intent, based on the plurality of concepts. In other words, the planner module 225 may determine the execution sequence of the plurality of actions, based on the parameters required to perform the plurality of actions and the result output by the execution of the plurality of actions. Accordingly, the planner module 225 may generate a plan including connection information (e.g., ontology) between a plurality of actions and a plurality of concepts. The planner module 225 may generate the plan, by using the information stored in the capsule DB 230 that stores a set of relationships between concepts and actions.

According to an embodiment, the NLG module 227 may change the designated information into information in the text form. The information changed to the text form may be in the form of a natural language utterance. The TTS module 229 according to an embodiment may change information in the text form to information in a voice form.

According to an embodiment, all or part of the functions of the natural language platform 220 may be also implemented in the user terminal 290.

The capsule DB 230 may store information about the relationship between the actions and the plurality of concepts corresponding to a plurality of domains. According to an embodiment, the capsule may include plurality of action objects (or action information) and concept objects (or concept information) included in the plan. According to an embodiment, the capsule DB 230 may store the plurality of capsules in the form of a concept action network (CAN). According to an embodiment, the plurality of capsules may be stored in a function registry included in the capsule DB 230.

The capsule DB 230 may include a strategy registry that stores strategy information required to determine a plan corresponding to a voice input. The strategy information may include reference information for determining a single plan in case that there are a plurality of plans corresponding to the voice input. According to an embodiment, the capsule DB 230 may include a follow-up registry that stores the information of the follow-up action for suggesting a follow-up action to the user in the designated context. For example, the follow-up action may include a follow-up utterance. According to an embodiment, the capsule DB 230 may include a layout registry for storing layout information of the information output via the user terminal 290. According to an embodiment, the capsule DB 230 may include a vocabulary registry that stores vocabulary information included in the capsule information. According to an embodiment, the capsule DB 230 may include a dialog registry that stores information about dialog (or interaction) with the user. The capsule DB 230 may update the object stored via a developer tool. For example, the developer tool may include a function editor for updating an action object or a concept object. The developer tool may include a vocabulary editor for updating the vocabulary. The developer tool may include a strategy editor that generates and registers a strategy for determining the plan. The developer tool may include a dialog editor that generates a dialog with the user. The developer tool may include a follow-up editor capable of activating a follow-up target and editing the follow-up utterance for providing a hint. The follow-up target may be determined based on the currently configured target, the preference of the user, or environment condition. The capsule DB 230 according to an embodiment may be also implemented in the user terminal 290.

The execution engine 240 according to an embodiment may calculate the result, using the generated plan. The end UI 250 may transmit the calculated result to the user terminal 290. Accordingly, the user terminal 290 may receive the result and provide the user with the received result. The management platform 260 according to an embodiment may manage information used by the intelligence server 200. According to an embodiment, the big data platform 270 may collect data of the user. According to an embodiment, the analytic platform 280 may manage the quality of service (QoS) of the intelligence server 200. For example, the analytic platform 280 may manage the element and processing speed (or efficiency) of the intelligence server 200.

According to an embodiment, the service server 300 may provide the user terminal 290 with a designated service (e.g., food order or hotel reservation). According to an embodiment, the service server 300 may be a server operated by a third party. According to an embodiment, the service server 300 may provide the intelligence server 200 with information for generating a plan corresponding to the received voice input. The provided information may be stored in the capsule DB 230. Furthermore, the service server 300 may provide the intelligence server 200 with result information according to the plan.

In the above-described integrated intelligence system 10, the user terminal 290 may provide the user with various intelligent services in response to a user input. The user input may include, for example, an input through a physical button, a touch input, or a voice input.

According to an embodiment, the user terminal 290 may provide a speech recognition service via an intelligence app (or speech recognition app) stored therein. In this case, for example, the user terminal 290 may recognize the user utterance or the voice input received via the microphone and may provide the user with a service corresponding to the recognized voice input.

According to an embodiment, the user terminal 290 may perform a designated action, based on the received voice input, independently, or together with the intelligence server 200 and/or the service server 300. For example, the user terminal 290 may execute an app corresponding to the received voice input, and may perform the designated action via the executed app.

According to an embodiment, when the user terminal 290 provides a service together with the intelligence server 200 and/or the service server 300, the user terminal 290 may detect a user utterance by using the microphone 295 and may generate a signal (or voice data) corresponding to the detected user utterance. The user terminal 290 may transmit the voice data to the intelligence server 200, using the communication interface 291.

According to an embodiment, the intelligence server 200 may generate a plan for performing a task corresponding to the voice input or the result of performing an action depending on the plan, as the response to the voice input received from the user terminal 290. For example, the plan may include the plurality of actions for performing the task corresponding to the voice input of the user and the plurality of concepts associated with the plurality of actions. The concept may define a parameter to be input for the execution of the plurality of actions or a result value output by the execution of the plurality of actions. The plan may include relationship information between the plurality of actions and the plurality of concepts.

According to an embodiment, the user terminal 290 may receive the response, using the communication interface 291. The user terminal 290 may output the voice signal generated in the user terminal 290 to the outside by using the speaker 294, or may output an image generated in the user terminal 290 to the outside by using the display 293.

FIG. 3 is a diagram 400 illustrating a form in which relationship information between a concept and an action is stored in a database according to an embodiment.

The capsule database (e.g., a capsule DB 230) of the intelligence server 200 may store a capsule in the form of a concept action network (CAN). The capsule database may store an action for processing a task corresponding to a user's voice input and a parameter necessary for the action, in the concept action network (CAN) form.

The capsule database may store a plurality of capsules (capsule A 401 and capsule B 404) respectively corresponding to a plurality of domains (e.g., applications). According to an embodiment, a single capsule (e.g., the capsule A 401) may correspond to one domain (e.g., a location (geo) or an application). In addition, at least one service provider (e.g., CP1 402 or CP2 403) for performing the function for the domain associated with the capsule may correspond to the single capsule. According to an embodiment, the single capsule may include one or more actions 410 and one or more concepts 420 for performing a designated function.

The natural language platform 220 may generate a plan for performing a task corresponding to the received voice input, by using the capsule stored in the capsule database. For example, the planner module 225 of the natural language platform may generate a plan by using the capsule stored in the capsule database. For example, the planner module 225 may generate a plan 407 by using actions 4011 and 4013 and concepts 4012 and 4014 of the capsule A 401 and an action 4041 and a concept 4042 of the capsule B 404.

Figure 4:
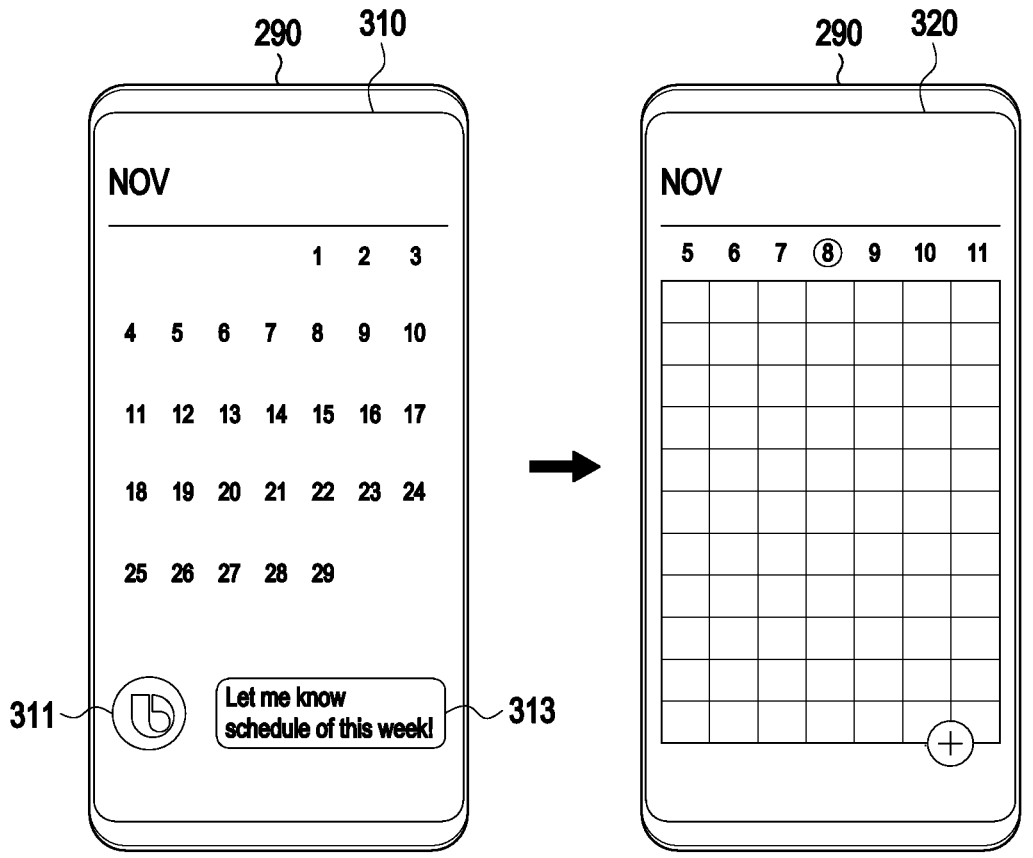
FIG. 4 illustrates a user terminal displaying a screen in which a received voice input is processed through an intelligent app according to an embodiment.

FIG. 4 illustrates a user terminal displaying a screen in which a received voice input is processed through an intelligent app according to an embodiment.

The user terminal 290 may execute an intelligence app to process a user input through the intelligence server 200.

According to an embodiment, in screen 310, when recognizing a designated voice input (e.g., wake up!) or receiving an input via a hardware key (e.g., a dedicated hardware key), the user terminal 290 may execute an intelligence app for processing a voice input. For example, the user terminal 290 may execute an intelligence app in a state where a schedule app is being executed. According to an embodiment, the user terminal 290 may display an object (e.g., an icon) 311 corresponding to the intelligence app, on the display 293. According to an embodiment, the user terminal 290 may receive a voice input by a user utterance. For example, the user terminal 290 may receive a voice input saying that "Let me know the schedule of this week!". According to an embodiment, the user terminal 290 may display a user interface (UI) 313 (e.g., an input window) of an intelligence app, in which text data of the received voice input is displayed, on a display.

According to an embodiment, in screen 320, the user terminal 290 may display the result corresponding to the received voice input, on the display. For example, the user terminal 290 may receive the plan corresponding to the received user input and may display 'the schedule of this week' on the display depending on the plan.

In the following detailed description, reference numerals in the drawings are identically assigned or omitted with respect to configurations that may be easily understood through the preceding embodiments, and detailed descriptions thereof may also be omitted. The electronic device 101 according to an embodiment disclosed in this document may be implemented by selectively combining configurations of different embodiments, and configurations according to an embodiment may be replaced by configurations of another embodiment. For example, it is noted that the disclosure is not limited to specific drawings or embodiments.

On the other hand, speech recognition technology is a technology for recognizing human voice and identifying linguistic meaning from the recognized human voice, and an electronic device that provides speech recognition service may learn a speech recognition model to perform speech recognition. The speech recognition model may recognize a user's utterance in order to execute a function of the electronic device.

For example, there are many cases in which a user makes an utterance using predicates such as "play ~" and "show ~" in order to use the speech recognition function. Here, an object preceding a predicate, for example, "~" may be referred to as a core execution word, and "play" following the object may be referred to as a predicate. In case that the user makes an utterance without a predicate, the speech recognition model may have a difficulty to grasp the user's utterance intent only with the core execution language because the speech recognition model does not have a predicate. Accordingly, in case that a user makes an utterance using only a core execution word without a predicate, the speech recognition rate (or execution rate) may be considerably lowered. In addition, the speech recognition model needs to pre-learn core execution words in order to recognize user utterances without predicates. However, the number of words considered to be core execution words is vast, and thus it is difficult to determine a core execution word to learn.

An embodiment may provide an electronic device for processing user utterance in real time by learning content-related utterance without a predicate so as to increase a speech recognition rate, an operating method thereof, and a storage medium.

Figure 5:
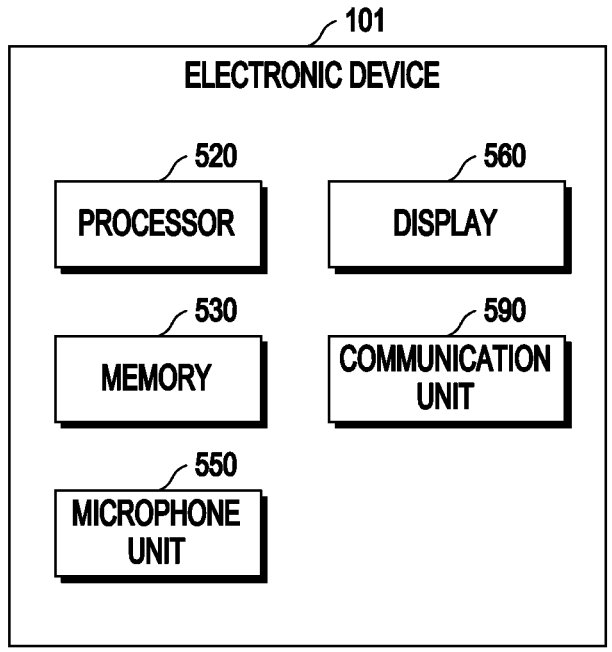
FIG. 5 is an internal block configuration diagram of an electronic device according to an embodiment.

FIG. 5 is an internal block configuration diagram of an electronic device according to an embodiment.

Referring to FIG. 5, an electronic device 101 (e.g., the electronic device 101 of FIG. 1 or the user terminal 290 of FIG. 2) according to an embodiment may include at least one processor 520 (e.g., the processor 120 of FIG. 1, the processor 292 of FIG. 2), a memory 530 (e.g., the memory 130 of FIG. 1, the memory 299 of FIG. 2), a display 560 (e.g., the display module 160 of FIG. 1, the display 293 of FIG. 2), a microphone unit 550 (e.g., the input module 150 of FIG. 1, the microphone 295 of FIG. 2), and/or a communication module 590 (e.g., the communication module 190 of FIG. 1 and the communication interface 291 of FIG. 2). Here, not all elements shown in FIG. 5 are essential elements of the electronic device 101, and the electronic device 101 may be implemented with more or fewer elements than those shown in FIG. 5.

According to an embodiment, the processor 520 may control an overall operation of the electronic device 101 having a speech recognition function. For example, the processor 520 may be implemented as an application processor (AP).

According to an embodiment, the processor 520 may receive a voice uttered by a user through the microphone unit 550. The processor 520 may perform speech recognition on the user's voice and output a result of the speech recognition through the display 560 or a speaker (not shown). Processing of speech recognition on the user's utterance according to an embodiment may partially include automatic speech recognition (ASR) and/or natural language understanding (NLU) processing. For example, the user's voice may be converted into text using the ASR module (or ASR engine), and the NLU module (or NLU engine) may extract the meaning of the user's utterance from the recognition result of the ASR module.

According to an embodiment, the speech recognition process may be performed by a speech recognition module (or speech recognition engine) stored in the memory 530 of the electronic device 101, or by a server (e.g., the intelligent server 200 and/or the service server 300 of FIG. 2). Accordingly, the processor 520 may transmit the voice uttered by the user to the server or transmit the speech recognition result to the server.

According to an embodiment, the operation of the processor 520 to increase the speech recognition rate may be largely divided into an operation of collecting utterances and an operation of performing real-time learning based on the collected utterances.

First, in relation to the utterance collection operation, the processor 520 may perform an operation of acquiring learning data for recognizing a user's voice in real time so as to increase a speech recognition rate while performing speech recognition. According to an embodiment, the learning data may include utterance data corresponding to a user voice, for which speech recognition has failed. Here, the utterance data for which speech recognition has failed may represent data in which the intent corresponding to the voice has failed to be determined because the user's intent is unable to be identified. Failure in speech recognition indicates failure in ASR processing, and failure in determining the intent corresponding to the voice indicates failure in NLU processing. Therefore, in the following description, utterance data for which speech recognition has failed should be understood as utterance data for which a voice command has failed.

According to an embodiment, the processor 520 may collect utterance data for which the voice command has failed, and acquire text by speech recognition on at least a part of the collected utterance data.

The processor 520 may be configured to identify whether the text by speech recognition is a text without a predicate. For example, the text without a predicate may correspond to text without words indicating commands or requests. The processor 520 may be configured to obtain utterance data corresponding to content-related text (hereinafter referred to as a content-related utterance without a predicate) among texts without a predicate as learning data. According to an embodiment, the processor 520 may be configured to identify content-related text without a predicate by using a named entity search (NES).

According to an embodiment, the processor 520 may store, in the memory 530, utterance data for which a voice command has failed. For example, the processor 520 may store the utterance data for which the voice command has failed in a separate storage device, which is accessible by the server or electronic device 101, so that the server (e.g., the intelligent server 200 and/or the service server 300 of FIG. 2) may use the same as learning data. In addition, the processor may also transmit the utterance data for which the voice command has failed to the server so that they can be stored in the server.

The processor 520 may be configured to perform control to identify content-related utterance data without a predicate from utterance data for which a voice command has failed, and to perform natural language processing (NLP) on the identified utterance data in real time. As such, by performing additional learning in real time on a content-related utterance without a predicate for which the voice command has failed, speech recognition performance may be improved.

Meanwhile, in relation to the operation of real-time learning based on collected utterances, the processor 520 may update a speech recognition model for recognizing a user's voice based on learning data. Then, even in case that an utterance without a predicate is received from the user through the microphone unit 550, the processor 520 may be configured to identify a domain corresponding to the utterance without a predicate, and thus may perform speech recognition by using the updated speech recognition model corresponding to the identified domain.

According to an embodiment, the remaining operations associated with learning except for the utterance collection operation in the electronic device 101 may be performed in a server. For example, the server may update, based on learning data, a speech recognition model for recognizing a user's voice, identify a domain corresponding to an utterance without a predicate, and perform speech recognition by using the updated speech recognition model corresponding to the identified domain. Accordingly, at least a part of the remaining operations associated with the learning except for the utterance collection operation in the electronic device 101 may be implemented to be performed in the electronic device 101 or the server, respectively.

According to an embodiment, the processor 520 may receive a user's voice through the microphone unit 550 and convert the voice into input text by using an ASR module. The processor 520 may be configured to identify a named entity by performing named entity recognition on at least a part of the input text by using a named entity search (NES). The processor 520 may be configured to identify a domain corresponding to the identified named entity or information associated with the named entity among a plurality of domains by using the identified named entity or information associated with the named entity (e.g., category, classification, related word, hypernym). The processor 520 may determine an intent corresponding to the voice based on an intent determination model corresponding to the identified domain. Here, the intent determination model may be referred to as a learning model or an IC model. The processor 520 may determine the intent corresponding to the user's voice based on the intent determination model corresponding to the identified domain. When the intent corresponding to the voice is determined, the processor 520 may be configured to perform an operation corresponding to the determined intent.

Meanwhile, the processor 520 may be configured to identify a named entity included in the input text through recognition of the named entity and determine a category to which the named entity belongs. When the category to which the named entity belongs is determined, for example, at least one category to which the named entity included in the input text belongs may be determined among a plurality of predefined categories. For example, the named entity or named entity information (e.g., category) determined through the named entity recognition may be used for domain determination or intent determination.

Accordingly, even in case that the determination of the intent corresponding to the voice fails, the processor 520 may be able to identify a category to which the user's utterance belongs through the named entity recognition. For example, a plurality of categories may include content categories, such as music artists, music albums, music genres, movie actors, music songs, movie titles, TV program channels, TV program titles, videoclip channels, radio programs, radio channels, and podcast titles, and may refer to a field or region to which a user's voice corresponds. In an embodiment, a content category is described as an example in order to use a short utterance without a predicate as learning data, but this is only an example, and the plurality of categories may include other categories capable of distinguishing user voices.

In addition, the processor 520 may be configured to identify the size of the named entity based on the named entity included in the input text. Here, the size of the named entity may refer to the text length (e.g., number of characters) of the named entity. The processor 520 may be configured to identify whether the input text is a short sentence command. Here, a short sentence may include a case in which there is no predicate or the number of words or characters in the input text is equal to or less than a predetermined value. When the input text is identified as a short sentence, the processor 520 may be configured to train at least one intent determination model based on the identified named entity. Accordingly, when at least one intent determination model is updated (or modified) through learning using short utterances, the updated (or modified) at least one intent determination model may be generated. For example, a new intent determination model may be generated by learning/relearning the input text and the intent determination model. At least one updated (or modified) intent determination model may be used for speech recognition when a user's voice input occurs thereafter.

As described above, in case that the intent determination has failed, the processor 520 may be configured to identify a plurality of related domains mapped to a category determined based on the named entity included in the input text. For example, information on at least one domain mapped to each category may be pre-defined. Accordingly, the processor 520 may be configured to identify a plurality of related domains mapped to the category determined based on the named entity included in the input text, based on a mapping relationship between a predefined category and a domain. The plurality of related domains are identified as described above and accordingly, the processor 520 may be configured to learn at least one intent determination model corresponding to the identified plurality of domains, respectively, using the named entity included in the input text. In case that there is only one named entity included in the input text, the processor 520 may be configured to learn at least one intent determination model based on the one named entity.

On the other hand, an existing intent determination model may be trained using a short utterance. The intent determination model updated through learning may replace the existing intent determination model used for real-time speech recognition. For example, the processor 520 may be configured to acquire input text by speech recognition on at least one utterance data among pieces of utterance data, which are stored in the memory 530 and failed to determine an intent. When the input text corresponds to a text not including a predicate, the processor 520 may generate and manage an accumulated utterance list including the input text. In case that the input text corresponds to a content-related text among texts not including a predicate, the processor 520 may generate and manage the accumulated utterance list. The processor 520 may compare the generated accumulated utterance list with a pre-stored accumulated utterance list and, when a difference between the generated accumulated utterance list and the pre-stored accumulated utterance list is equal to or greater than a threshold ratio, the processor 520 may replace the existing intent determination model by the generated at least one intent determination model.

In an embodiment, the intent determination model may be largely divided into a main model and a runtime learning model. The main model may operate to focus on learning utterances "with a predicate", and the runtime learning model may be configured to focus on learning "content utterances without a predicate". Therefore, in case that two models are used, when an utterance "with or without a predicate" is received, the two models may determine the user's intent by dividing roles with each other. In addition, the runtime learning model may be replaced by another runtime learning model continuously trained based on an accumulated utterance list in the future, so that the real-time speech recognition rate (or execution rate) may be further increased.

According to an embodiment, the processor 520 may transmit/receive data to/from the server through the communication module 590. For example, voice data received through the microphone unit 550 of the electronic device 101 may be transmitted to a server (e.g., the intelligent server 200 and/or the service server 300 of FIG. 2) through a communication network. The server may perform speech recognition by ASR and/or NLU processing of voice data received from the electronic device 101. The speech recognition result processed by the server may include at least one task or voice output data, and the speech recognition result generated by the server may be transmitted to the electronic device 101 through the communication network. Detailed examples of a specific speech recognition process performed by the electronic device 101 or the server and speech recognition results will be described later.

According to an embodiment, a result of speech recognition processed by the electronic device 101 or the server may include text output data and/or voice output data. For example, the text output data may be output through the display 560. The voice output data may be output through a speaker (not shown) of the electronic device 101.

Meanwhile, at least a part of the above-described operation of the electronic device 10 may be performed by the server of FIG. 2 (e.g., the intelligent server 200 and/or the service server 300 of FIG. 2).

According to an embodiment, an electronic device (101) may include a microphone (295, 550), a processor (120, 292, 520), and memory (130, 299, 530) storing instructions. According to an embodiment, the instructions that, when executed by the processor may be configured to cause the electronic device acquire utterance data corresponding to a voice of a user through the microphone. According to an embodiment, the instructions may be configured to cause the electronic device to acquire first input text by speech recognition on the utterance data. According to an embodiment, the instructions may be configured to cause the electronic device to identify a named entity in at least part of the first input text. According to an embodiment, the instructions may be configured to cause the electronic device to determine an intent corresponding to the voice based on a first intent determination model determined by using the identified named entity. According to an embodiment, the instructions may be configured to cause the electronic device to, in case that the intent determination has failed, identify whether the first input text is a text not including a predicate. According to an embodiment, the instructions may be configured to cause the electronic device to, in case that the first input text is the text not including a predicate, generate at least one second intent determination model based on the first input text.

According to an embodiment, the instructions may be configured to cause the electronic device to, based on the named entity included in the first input text, identify a category and a size of the named entity, and in case that the intent determination has failed, identify whether the first input text is the text not including a predicate, based on the identified category and the size of the named entity.

According to an embodiment, the instructions may be configured to cause the electronic device to, in case that the intent determination has failed, identify a plurality of related domains mapped to the category having been determined based on the named entity included in the first input text, and generate the at least one second intent determination model corresponding to the identified plurality of domains respectively, based on the first input text.

According to an embodiment, the instructions may be configured to cause the electronic device to, in case that the intent determination has failed, identify whether the first input text is a content-related text not including a predicate among texts not including a predicate by using a named entity search (NES).

According to an embodiment, the instructions may be configured to cause the electronic device to, in case that the intent determination has failed, and when one named entity is identified from at least part of the first input text, generate the at least one second intent determination model based on the identified one named entity.

According to an embodiment, the instructions may be configured to cause the electronic device to identify a domain corresponding to the identified named entity among a plurality of domains, and determine an intent corresponding to the voice based on the first intent determination model corresponding to the identified domain.

According to an embodiment, the instructions may be configured to cause the electronic device to acquire second input text by speech recognition on at least one utterance data among pieces of utterance data, which are stored in the memory and failed to determine intent, and generate an accumulated utterance list including the second input text when the second input text is the text not including a predicate.

According to an embodiment, the instructions may be configured to cause the electronic device to compare the generated accumulated utterance list with a pre-stored accumulated utterance list, and in case that a difference between the generated accumulated utterance list and the pre-stored accumulated utterance list is equal to or greater than a threshold ratio, replace the first intent determination model by the generated at least one second intent determination model.

According to an embodiment, the instructions may be configured to cause the electronic device to perform automatic speech recognition (ASR) and/or natural language understanding (NLU) so as to acquire first input text by speech recognition on the utterance data.

According to an embodiment, the instructions may be configured to cause the electronic device to, in case that intent corresponding to the voice is determined, perform an operation corresponding to the determined intent.

According to an embodiment, an electronic device (101) may include a microphone (295, 550), a processor (120, 292, 520), and memory (130, 299, 530) storing instructions. According to an embodiment, the instructions that, when executed by the processor may be configured to cause the electronic device to acquire utterance data corresponding to a voice of a user through the microphone. According to an embodiment, the instructions may be configured to cause the electronic device to acquire first input text by speech recognition applied to the utterance data. According to an embodiment, the instructions may be configured to cause the electronic device to identify a named entity based on the first input text. According to an embodiment, the instructions may be configured to cause the electronic device to determine, based on the utterance data and using the named entity and a first intent determination model, an intent. According to an embodiment, the instructions may be configured to cause the electronic device to detect that the intent determination has resulted in a failure. According to an embodiment, the instructions may be configured to cause the electronic device to, responsive to the failure, identify whether the first input text is a text not including a predicate. According to an embodiment, the instructions may be configured to cause the electronic device to, based on the first input text not including the predicate, generate one or more second intent determination models based on the first input text.

According to an embodiment, the instructions may be configured to cause the electronic device to, identify a category and a size of the named entity, and responsive to the failure, determine, based on the category and the size, that the first input text does not include the predicate.

According to an embodiment, the instructions may be configured to cause the electronic device to, responsive to the failure, map the category to one or more domains, and generate, based on the first input text, the one or more second intent determination models corresponding respectively to the one or more domains.

According to an embodiment, the instructions may be configured to cause the electronic device to, responsive to the failure, use a named entity search (NES) to identify the named entity and identify whether the first input text is a content-related text not including the predicate among texts not including the predicate.

According to an embodiment, the instructions may be configured to cause the electronic device to, responsive to the failure, generate the one or more second intent determination models based on the named entity.

According to an embodiment, the instructions may be configured to cause the electronic device to identify a first domain corresponding to the named entity among the one or more domains, and determine a first intent corresponding to the voice based on the first intent determination model corresponding to the first domain.

According to an embodiment, the instructions may be configured to cause the electronic device to acquire second input text by speech recognition applied to the utterance data, wherein the utterance data is stored in the memory and is associated with the failure, and generate an accumulated utterance list including the second input text, wherein the second input text does not include the predicate.

According to an embodiment, the instructions may be configured to cause the electronic device to compare the accumulated utterance list with a pre-stored accumulated utterance list, and based on a difference between the accumulated utterance list and the pre-stored accumulated utterance list being equal to or greater than a threshold ratio, replace the first intent determination model with a corresponding second intent determination model of the one or more second intent determination models.

According to an embodiment, the instructions may be configured to cause the electronic device to apply automatic speech recognition (ASR) to the utterance data to acquire the first input text.

According to an embodiment, the instructions may be configured to cause the electronic device to perform an operation corresponding to the first intent.

FIG. 6 is a flowchart illustrating an operation in an electronic device according to an embodiment. Referring to FIG. 6, an operation method may include operations 605 to 630. Each operation of the operation method in FIG. 6 may be performed by an electronic device (e.g., at least one of the electronic device 101 of FIG. 1, the electronic device 101 of FIG. 5 or the user terminal 290 of FIG. 2, and at least one processor of the electronic device (e.g., the processor 120 of FIG. 1, the processor 292 of FIG. 2, or the processor 520 of FIG. 5). In an embodiment, at least one of operations 605 to 630 may be omitted, the order of some operations may be changed, or another operation may be added.

In operation 605, the electronic device 101 may be configured to acquire utterance data corresponding to a voice of a user through the microphone of the electronic device.

In operation 610, the electronic device 101 may be configured to acquire first input text by speech recognition on the utterance data.

In operation 615, the electronic device 101 may be configured to identify a named entity from at least part of the first input text. According to an embodiment, the electronic device 101 may be configured to perform automatic speech recognition (ASR) and/or natural language understanding (NLU) to acquire first input text by speech recognition on the utterance data.

In operation 620, the electronic device 101 may be configured to determine an intent corresponding to the voice based on a first intent determination model determined by using the identified named entity. When the intent corresponding to the voice is determined, the electronic device 101 may perform an operation corresponding to the determined intent. According to an embodiment, the electronic device 101 may be configured to identify a corresponding domain among a plurality of domains by using the identified named entity or named entity information (e.g., category), and to determine an intent corresponding to the voice based on the first intent determination model corresponding to the identified domain.

In operation 625, the electronic device 101 may be configured to, in case that the intent determination has failed, identify whether the first input text is a text not including a predicate. According to an embodiment, the electronic device 101 may be configured to identify a category and a size of the named entity based on the named entity included in the first input text. Here, the size of the named entity may refer to the text length (e.g., the number of characters) of the named entity. When the intent determination has failed, the electronic device 101 may be configured to identify whether the first input text is a text not including a predicate, based on the identified category and the size of the named entity. The electronic device 101 may be configured to identify whether the first input text is a content-related text not including a predicate among texts not including a predicate, by using a named entity search (NES).

In operation 630, in case that the first input text is a text not including a predicate, the electronic device 101 may be configured to perform an operation of learning at least one second intent determination model based on the first input text. According to an embodiment, the electronic device 101 may be configured to identify a plurality of related domains mapped to a category determined based on the named entity included in the first input text. The electronic device 101 may be configured to train the at least one second intent determination model respectively corresponding to the identified plurality of domains, based on the first input text.

According to an embodiment, when one named entity is identified from at least part of the first input text, the electronic device 101 may be configured to train the at least one second intent determination model based on the identified named entity. According to an embodiment, the electronic device 101 may be configured to generate one or more additional command sentences based on the identified named entity, and to train a second intent determination model based on the one or more additional command sentences.

According to an embodiment, the electronic device 101 may be configured to acquire second input text by speech recognition on at least one utterance data among pieces of utterance data, which are stored in in the memory of the electronic device and failed to determine an intent. When the second input text is the text not including a predicate, the electronic device 101 may generate an accumulated utterance list including the second input text. In case that a difference between the generated accumulated utterance list and the pre-stored accumulated utterance list is equal to or greater than a threshold ratio, the electronic device 101 may perform an operation of replacing the first intent determination model by the generated at least one second intent determination model.

Figure 7:
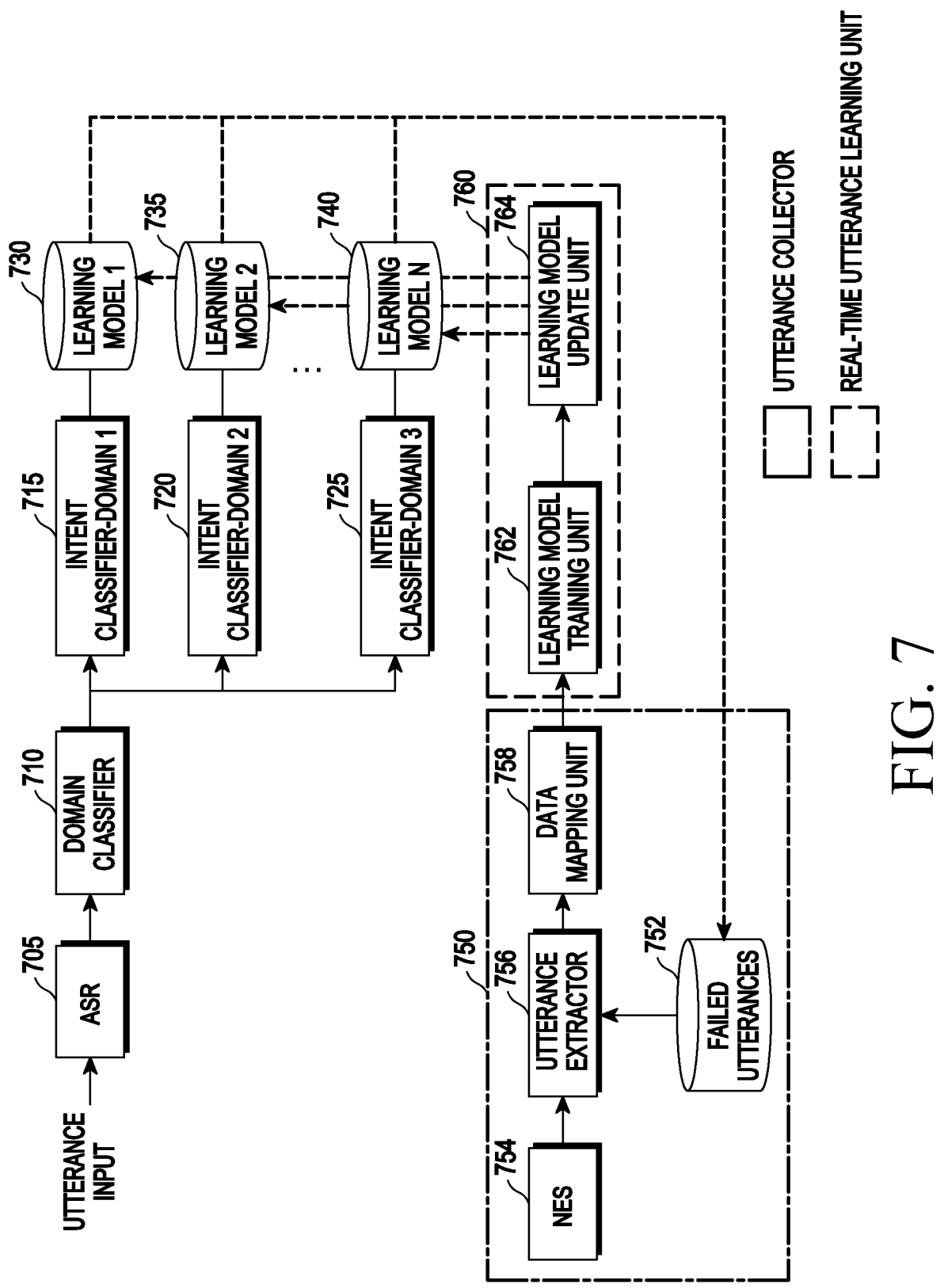
FIG. 7 is a configuration diagram for explaining utterance collection for utterance processing and real-time utterance learning operation according to an embodiment.

FIG. 7 is a configuration diagram for explaining utterance collection for utterance processing and real-time utterance learning operation according to an embodiment.

Referring to FIG. 7, a configuration unit for processing a short utterance without a predicate may largely include an utterance collector 750 and a real-time utterance learning unit 760.

As shown in FIG. 7, when an utterance corresponding to a user's voice is input through a microphone in the electronic device 101, an ASR 705 may recognize the voice and convert the recognized voice into input text, and a domain classifier 710 may identify a domain of the user's voice by using data such as a keyword and a predicate included in the input text. According to an embodiment, the electronic device 101 may be configured to perform named entity recognition during a domain identification operation and determine the named entity and named entity information (e.g., category) included in the input text. The electronic device 101 may be configured to determine a domain corresponding to the input text using the determined named entity and named entity information.

The domain classifier 710 may determine a domain corresponding to an utterance command such as a keyword or a predicate. Different intent classifiers 715, 720, and 725 are designated for domains respectively. Intent classifiers 715, 720, and 725, may identify the user's intent by referring to learning models 730, 735, and 740 corresponding to the respective domains. The user's intent corresponding to the utterance command may be determined using the intent classifier belonging to the determined domain. In this case, the learning models 730, 735, and 740 referred to by the respective intent classifiers 715, 720, and 725 during operation may be independently configured for each domain.

Meanwhile, according to an embodiment, when the intent determination has failed, the utterance collector 750 may perform an operation of selecting a content-related short utterance from among failed utterance data. To this end, the learning models 730, 735, and 740 may transfer failed utterance data 752 to the utterance collector 750 so that the utterance collector 750 may use the utterance data as learning data, and may even store the utterance data in a separate storage device (e.g., the memory 530). The utterance collector 750 may include an NES module 754 configured to identify named entities from failed utterance data, and an utterance extractor 756 for extracting utterances to be used as learning data from failed utterance data by using the identified named entity, and a data mapping unit 758 configured to determine a learning model to be associated with the extracted utterance.

The real-time utterance learning unit 760 may perform an operation of transmitting the utterance to the NLP module in service in real time and learning, based on the content-related short utterance selected by the utterance collector 750. The real-time utterance learning unit 760 may include a learning model training unit 762 configured to train a learning model, and a learning model update unit 764 configured to update at least one of the learning models 730, 735, and 740 referred to by the respective intent classifiers 715, 720, and 725 during operation, and replace the trained learning model by a new learning model when a predetermined condition is satisfied.

Figure 9:
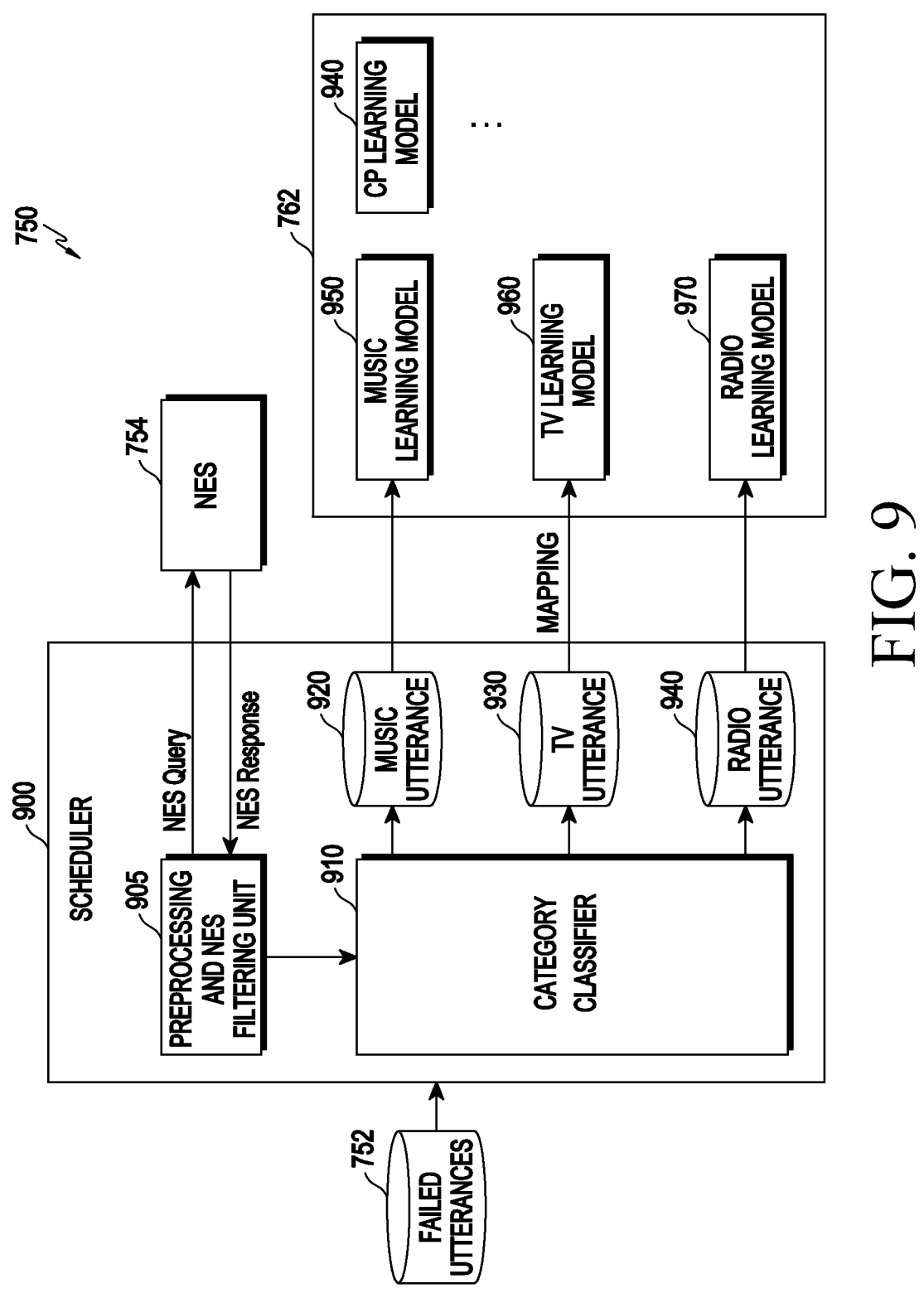
FIG. 9 illustrates an operation for utterance collection according to an embodiment.

Thus, when a user's utterance does not include a verb (predicate) and the user's utterance passes through various processing, the failure of not matching the user's intent is detected. See FIG. 6 item 625. The user's utterance corresponding to the failure is processed using categories and domains to identify models (FIG. 7 items 730, 735, 740) be updated or replaced using the utterance collector and the real-time utterance learning unit (see FIG. 7, also FIG. 12). Examples of categories are shown in FIG. 11. Examples of domains are shown in FIG. 9, right hand side, also FIG. 12, right hand side. This process changes the computer machine represented by the models (FIG. 7 items 730, 735, 740), and improves determination of user intent. The proper delivery of desired content to the user is then improved, even when the user's utterance is irregular and does not include a verb. See FIG. 15, the right hand portion, "action succeeds."

Detailed examples of specific operations performed by the utterance collector 750 or the real-time utterance learning unit 760 will be described later with reference to FIGS. 9 and 15.

Figure 8:
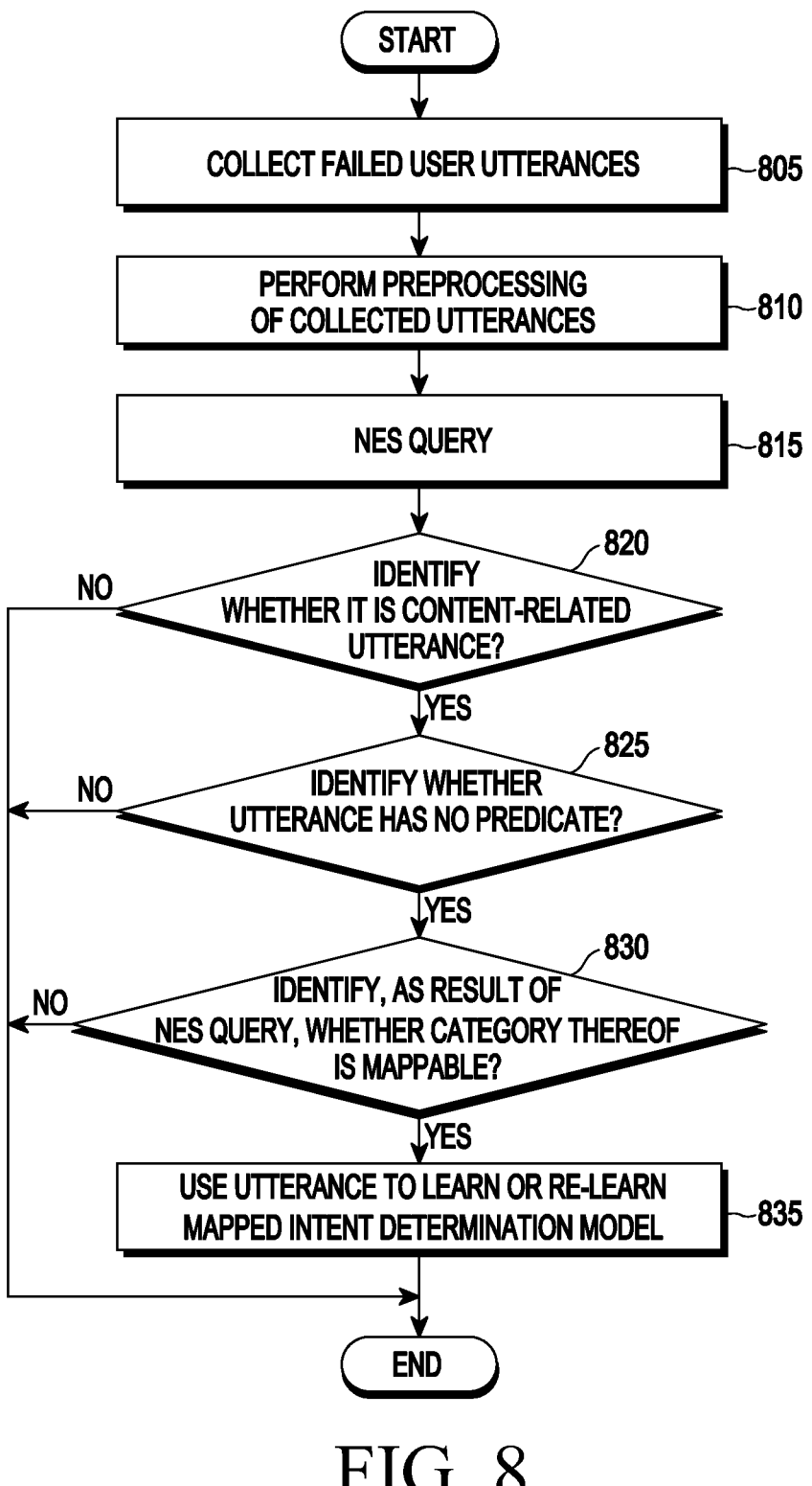
FIG. 8 is a flowchart illustrating an operation during utterance collection according to an embodiment.

FIG. 8 is a flowchart illustrating an operation during utterance collection according to an embodiment. In order to help understanding with respect to FIG. 8, a description may be made with reference to FIGS. 9 to 11. FIG. 9 illustrates an operation for utterance collection according to an embodiment, FIG. 10 illustrates a method for identifying content utterance text without a predicate according to an embodiment, and FIG. 11 illustrates an example of a category for classifying content utterance text according to an embodiment. For example, a detailed configuration of the utterance collector 750 in FIG. 7 may be as shown in FIG. 9.

In operation 805, the electronic device 101 may collect failed user utterances. For example, the collected user utterance may be a user utterance for which a voice command fails. Referring to FIG. 9, individual learning models 730, 735, and 740 may transfer utterance data 752 for which a voice command fails to a scheduler 900 of the utterance collector 750. The utterance data 752 for which the voice command fails may be collected for real-time learning. For example, each time a voice command fails, failed utterance data may be transferred to the utterance collector 750 in real time, and the utterance collector 750 may perform an operation of identifying whether or not the failed utterance data corresponds to a content-related utterance without a predicate each time the transfer of the failed utterance data occurs. In addition, the utterance collector 750 may wait until the failed utterance data is accumulated to a predetermined amount and, when the predetermined amount of failed utterance data is accumulated, may perform an operation of selecting content-related utterance without a predicate from among the accumulated failed utterance data.

In operation 810, the electronic device 101 may perform preprocessing of the collected utterances. According to an embodiment, the utterance collector 750 may perform a preprocessing operation through a preprocessing and NES filtering unit 905 before performing an operation of selecting a content-related utterance without a predicate.

Meanwhile, the electronic device 101 may be configured to determine which utterance among failed utterances to use as learning data. For example, all of the collected utterances are utterances that fail to determine the intent, but utterances usable for learning may be selected. To this end, the electronic device 101 may be configured to convert failed utterance data into input text and remove unnecessary utterances through preprocessing. For example, the electronic device 101 may perform a preprocessing operation of limiting the number of characters in the input text and excluding utterances including predefined rejection words. For example, the number of characters may be determined within 3 to 30 characters. In addition, the predefined rejection words may include words associated with devices or daily expressions, for example, "alarm", "fine dust", "message", "passed by", "sub menu", and "dictation" may be pre-configured or when the electronic device 101 is manufactured. However, the predefined rejection words used for utterance exclusion are not limited thereto and may be additionally updated.

In operation 815, the electronic device 101 may perform a NES query. According to an embodiment, the NES 754 may be used for utterance classification, and the NES 754 may quickly search whether a named entity exists in utterances. The utterance collector 750 may transfer utterances to use the NES 754, and may obtain an NES response from the NES 754 in response thereto. In this case, the utterances transmitted to the NES 754 may be utterances preprocessed through the preprocessing and NES filtering unit 905.

In operation 820, the electronic device 101 may be configured to identify whether the utterance corresponds to a content-related utterance, and in operation 825, the electronic device 101 may be configured to identify whether the utterance has no predicate. In case that the utterance is not content-related utterance, the electronic device 101 may exclude the utterance from learning. Likewise, in case that the utterance has a predicate, the electronic device 101 may exclude the utterance from learning. In operation 830, the electronic device 101 may be configured to identify, as a result of the NES query, whether the category thereof is mappable. As the result of the NES query, in case that the category is not mappable, the electronic device 101 may exclude the corresponding utterance from learning. In case that the utterance is neither a content-related utterance nor an utterance without a predicate, the utterance is not used for learning because it is not possible to designate a learning model to be trained in association with the utterance.

For example, referring to FIG. 9, based on the NES query result, the utterance collector 750 may identify whether at least a part of the pieces of utterance data 752 for which the voice command has failed are short sentences without a predicate and whether they are content-related utterances. The category classifier 910 may classify short utterances without a predicate among the pieces of utterance data 752 for which the voice command has failed, by category, based on the identification result. Although FIG. 9 exemplifies a case in which short utterance without a predicate is classified into a music-related utterance 920, a TV-related utterance 930, and a radio-related utterance 940, examples of categories that may be classified may not be limited thereto.

In operation 835, the electronic device 101 may use the utterance to learn or re-learn the mapped intent determination model. For example, in case that the utterance is identified as the content-related utterance and a short utterance without a predicate as well, the utterance data may be used in the intent determination model (or learning model) mapped to the category so that the intent determination model is enabled to be trained.

For example, short utterances without predicates classified into the music-related utterance 920, TV-related utterance 930, and radio-related utterance 940 may be transferred to at least a part of learning modules mapped to respective categories, e.g., a music learning model 950, a TV learning model 960, a radio learning model 970, and a CP learning model 940. As such, according to an embodiment, utterances of a corresponding category may be mapped to each individual learning model in the learning model training unit 762 and used.

For example, the utterance collector 750 may obtain an NES query result as shown in FIG. 10. FIG. 10 illustrates an exemplary in which an NES query result 1010 for an utterance including a predicate is compared with an NES query result 1020 for an utterance that does not include a predicate. For example, when the NES 754 is queried for the utterance "Play Howl's Moving Castle," the NES 754 may be configured to identify that "Howl's Moving Castle" exists as an named entity in the utterance. However, the NES query result 1010 may not correspond to a short sentence without a predicate because a predicate corresponding to a command or a request such as "play it" exists.

On the other hand, when the NES 754 is queried for the utterance "Howl's Moving Castle," the NES 754 may be configured to identify that "Howl's Moving Castle" exists as an named entity in the utterance. In addition, since the NES query result 1020 does not have a predicate, the NES query result 1020 may correspond to a short sentence without a predicate, and may include information indicating a category 1030 associated with the named entity and a size 1040 of the named entity. For example, the NES query result 1020 illustrates a case in which the category associated with the named entity includes a plurality of categories such as "movie.title", "tv_program.title", and "music.album".

In addition, FIG. 11 illustrates a plurality of categories 1100 pre-defined. As shown in FIG. 11, the plurality of categories may include content-related categories, such as music artists, music albums, music genres, movie actors, music songs, movie titles, TV program channels, TV program titles, video clip channels, radio programs, radio channels, and podcast titles.

In a case of receiving the NES query result 1020 as shown in FIG. 10, the preprocessing and NES filter unit 905 may identify whether or not a short utterance occurs, based on the size of the named entity included in the NES query result 1020. As a result of the identification of whether or not short utterance occurs, in case that a failed utterance corresponds to a short utterance, the preprocessing and NES filter unit 905 may transfer the failed utterance to the category classifier 910. In this case, the utterance transmitted to the category classifier 910 may be a short utterance without a predicate.

The category classifier 910 may be configured to identify a corresponding category among a plurality of predefined categories based on at least one category included in the NES query result 1020. The category classifier 910 may be configured to identify a category to which the short utterance without a predicate or the named entity included in the short utterance without a predicate belongs. For example, based on the NES query result 1020, in case that a category associated with the named entity is "movie.title", "tv_program.title", or "music.album", these correspond to the movie titles, TV program titles, and music albums in FIG. 11, and thus the category of utterance without a predicate may be identified as a content-related category.

As described above, when input text by speech recognition for utterance data corresponding to a user's voice is a content-related text that does not include a predicate, the electronic device 101 may be configured to train at least one intent determination model (or learning model). For example, the electronic device 101 may use utterance data in at least one learning model corresponding to a category associated with the input text for the utterance data or the named entity included in the input text so as to enable the corresponding learning model to be trained.

Figure 12:
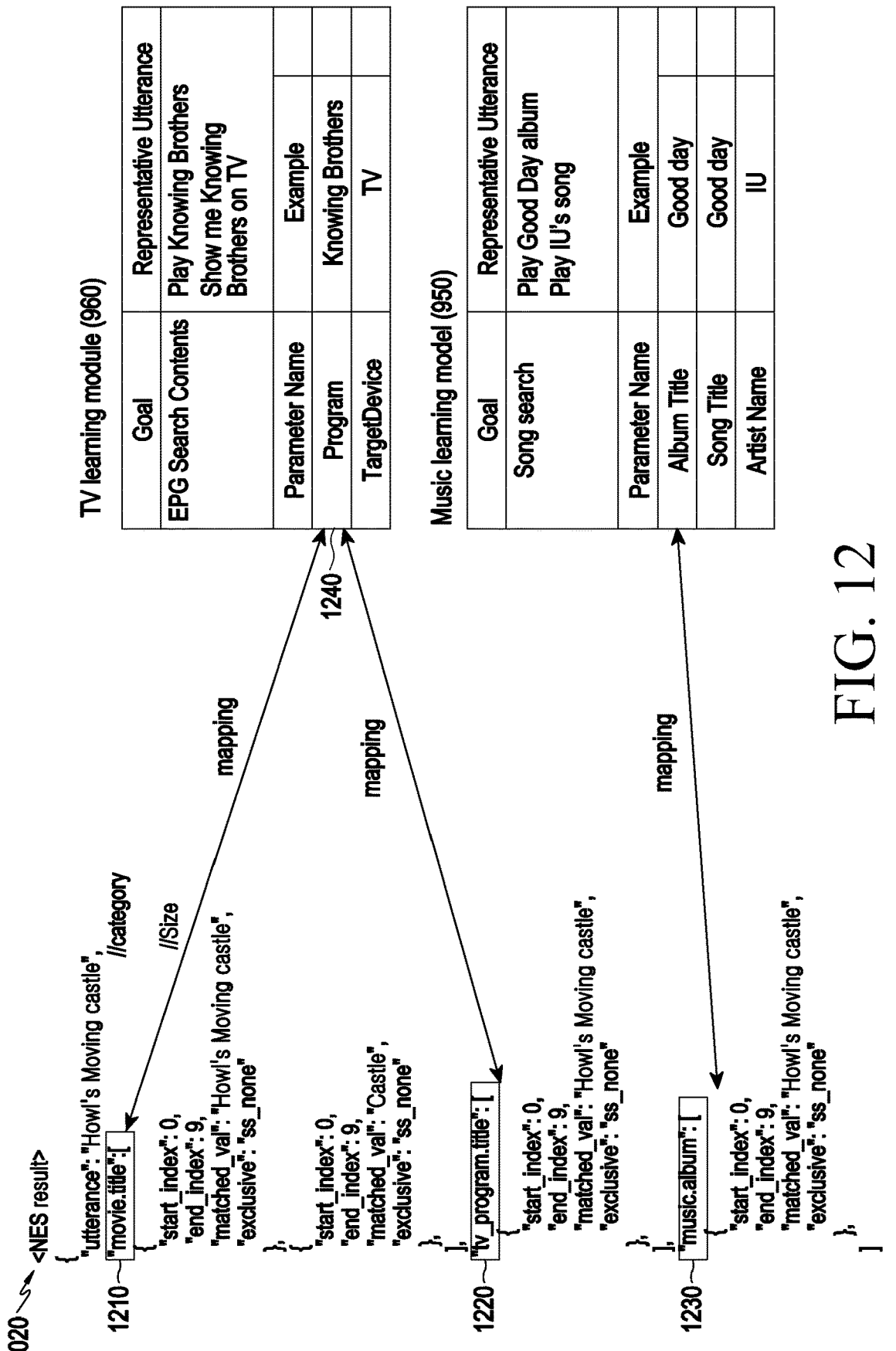
FIG. 12 illustrates a mapping relationship between a category and a plurality of domains according to an embodiment.
Figure 13:
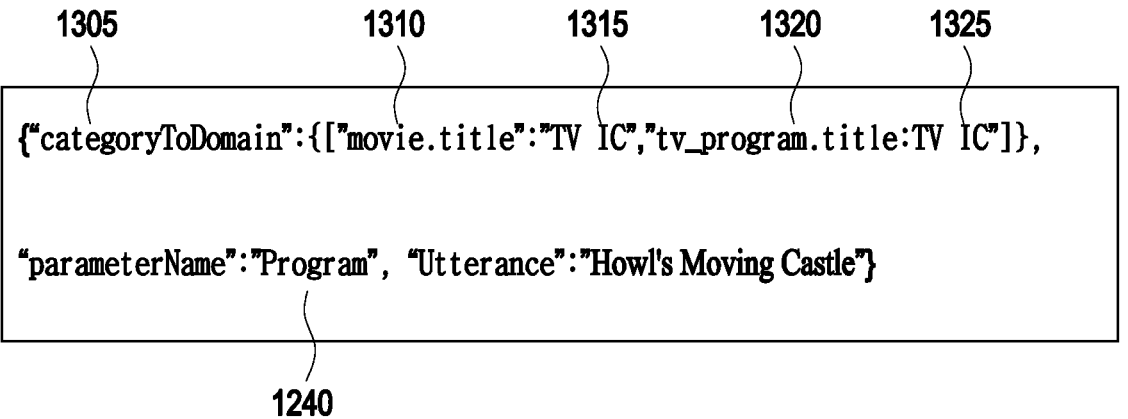
FIG. 13 illustrates an example of learning data transmitted to a learning model according to an embodiment.

In an embodiment, as shown in FIG. 10, a plurality of categories associated with named entities may be provided, and accordingly, a plurality of learning models mappable to the categories may be provided. FIGS. 12 and 13 will be referred to explain the mapping relationship between these categories and learning models. FIG. 12 illustrates a mapping relationship between a category and a plurality of domains according to an embodiment, and FIG. 13 illustrates an example of learning data transferred to a learning model according to an embodiment.

Referring to FIG. 12, the NES result 1020 may include a plurality of categories 1210, 1220, and 1230 associated with named entities, and training of learning models by associating the same with categories may be determined based on a predefined mapping relationship. For example, the NES result and the learning parameter of each learning model in a N:M relationship. Accordingly, utterance data to be used as learning data, that is, a content-related utterance without a predicate may be transferred to a corresponding learning model according to a mapping relationship, and the learning model may be trained.

For example, "Howl's Moving Castle" is an input target (or learning data) to be trained, and the input target may be transferred to an individual learning model based on a mapping relationship as shown in FIG. 12 to be used to train each learning model.

In FIG. 12, when a category called "movie.title" is identified as a NES result and, in case that a mapping relationship is pre-defined to correspond to a "program" parameter 1240 of the TV learning model 960, content-related utterances without a predicate are automatically transmitted to the TV learning model 960 and may be used for learning. According to a predefined mapping relationship, a category called "tv_program.title" may correspond to the "program" parameter 1240 of the TV learning model 960, and a category called "music.album" may correspond to an "album title" parameter of the music learning model 950.

Learning data transferred to each learning model in FIG. 12 may be represented as shown in FIG. 13. Referring to FIG. 13, "categoryToDomain" 1305 indicates that a category is assigned to a domain, and "movie.title": "TV IC" may indicate that a category called "movie.title" 1310 is mapped to a learning model 1315 called "TV IC". Further, "tv_program.title: TV IC" may indicate that a category called "tv_program.title" 1320 is mapped to a learning model 1325 called "TV IC". In addition, the learning data of FIG. 13 may indicate that learning data of "Howl's Moving Castle" is designated to be trained as a parameter of "program" 1240 of the corresponding learning model.

Figure 14:
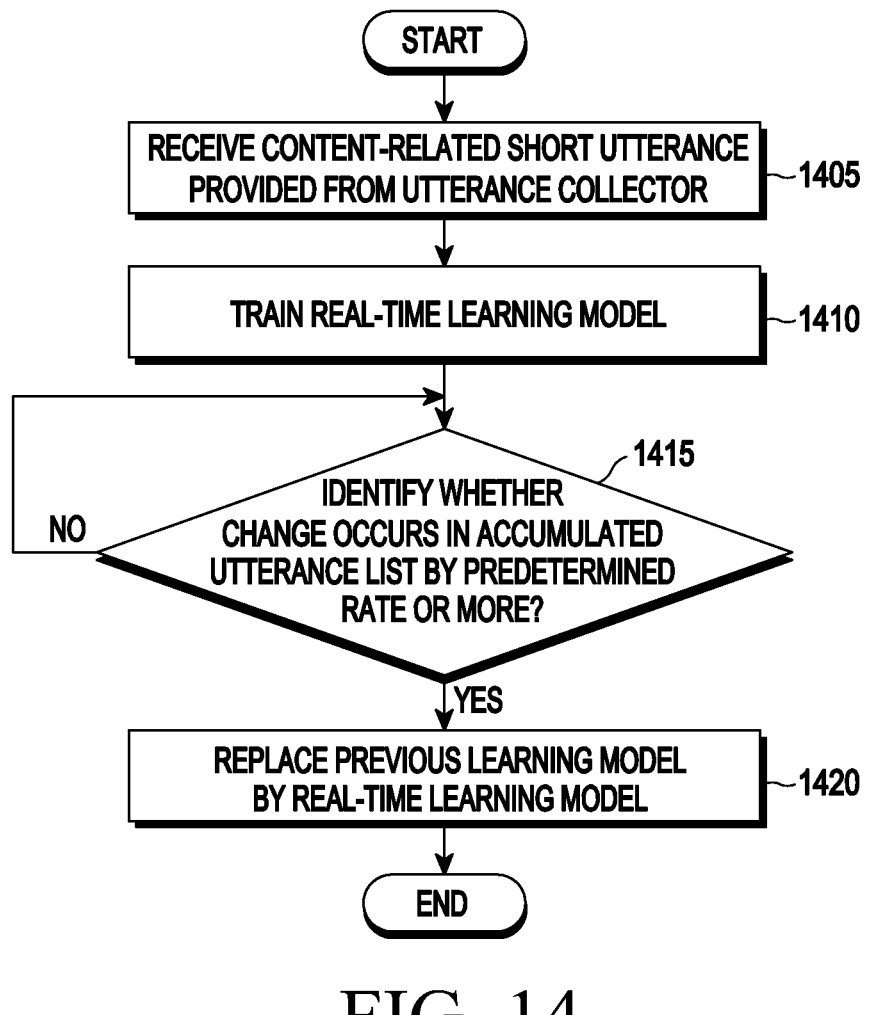
FIG. 14 is a flowchart illustrating an operation during real-time utterance learning according to an embodiment.

According to an embodiment, the real-time utterance learning unit 760 may receive utterance data selected and refined by the utterance collector 750, and may support learning to increase the speech recognition rate in the NLP performing speech recognition in real time. FIGS. 14 and 15 may be referred to examine specifically the operation of the real-time utterance learning unit 760. FIG. 14 is a flowchart illustrating an operation during real-time utterance learning according to an embodiment, and FIG. 15 illustrates an operation for real-time utterance learning according to an embodiment.

In operation 1405, the electronic device 101 may receive a content-related short utterance provided from an utterance collector. Here, the content-related short utterance may be selected from utterances for which a voice command fails.

In operation 1410, the electronic device 101 may train a real-time learning model. For example, the real-time utterance learning unit 760 may train at least one learning model to which a category corresponding to a content-related short utterance belongs. In an embodiment, rather than distributing a learning model for speech recognition after the training of the learning model has been completed, the speech recognition rate may be increased by using a learning model that is replaceable by a learning model that has been trained.

Figure 15:
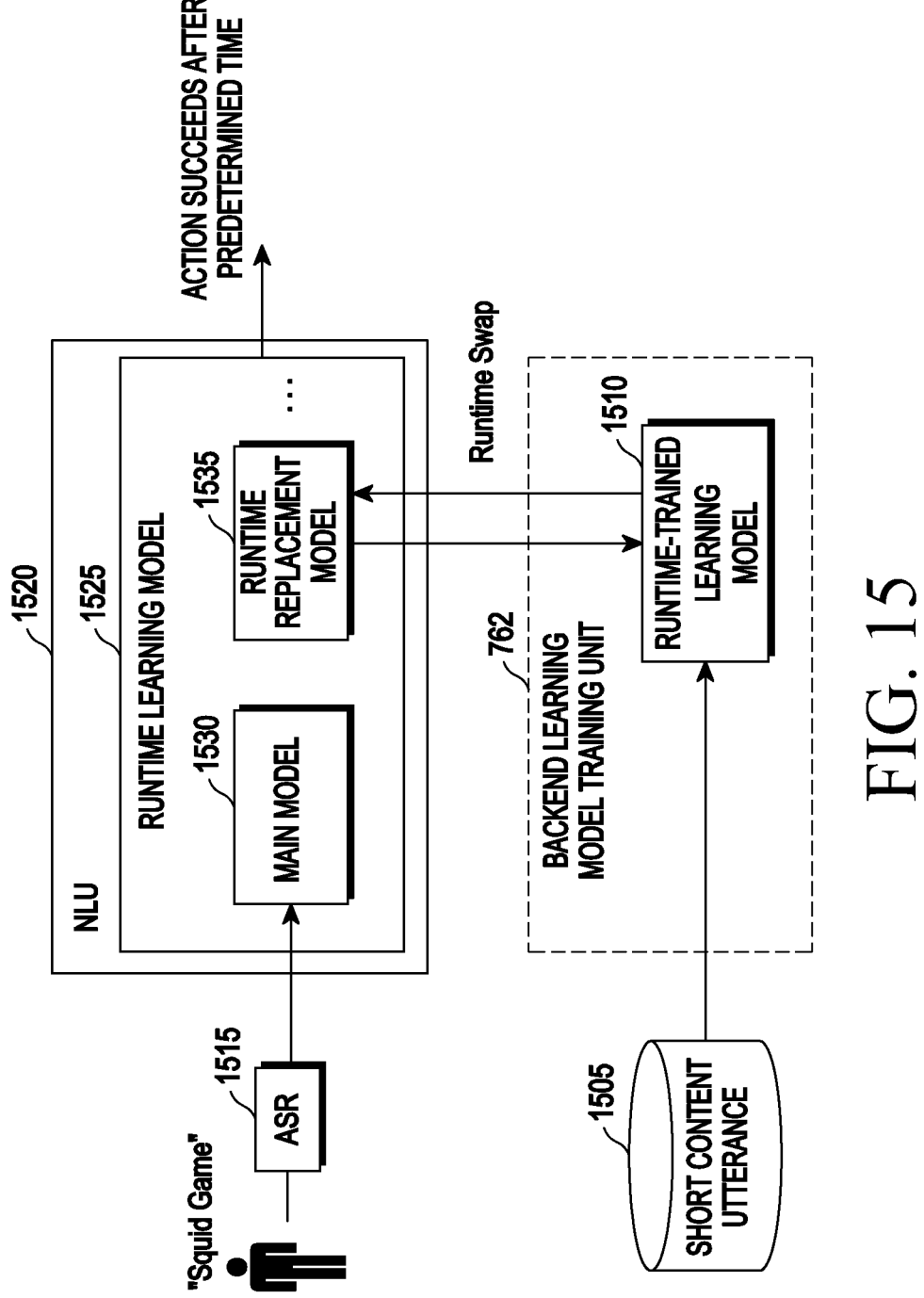
FIG. 15 illustrates an operation for real-time utterance learning according to an embodiment.

In an embodiment, as shown in FIG. 15, a runtime learning model 1525 in an NLU 1520 may be largely divided into a main model 1530 and a runtime replacement model 1535. The main model 1530 may operate to focus on learning utterances "with a predicate", and the runtime replacement model 1535 may be configured to focus on learning "content speech without a predicate". Therefore, when an utterance corresponding to the user's voice is input, an ASR 1515 converts the utterance into input text, and when an utterance with a predicate is received, the main model 1530 may determine the user's intent for the utterance with a predicate. On the other hand, when an utterance without a predicate is received, the user's intent for the utterance without a predicate may be determined in the runtime replacement model 1535.

Meanwhile, when a specific condition is satisfied, the runtime replacement model 1535 may be replaced in real time by a runtime-trained learning model 1510 updated through learning in the learning model training unit 762 in the backend. Here, the specific condition may include the accumulated number of utterances.

In operation 1415, the electronic device 101 may be configured to identify whether a change occurs in the accumulated utterance list by a predetermined rate or more. In response to occurrence of the change in the accumulated utterance list by a predetermined rate or more, the electronic device 101 may replace the previous learning model by the real-time learning model in operation 1420. In case that the accumulated utterance list does not change by a predetermined rate or more, the learning model referred to at the time of determining the intent may be maintained.

According to an embodiment, the electronic device 101 may be configured to obtain input text by speech recognition on at least one utterance data among the failed utterance data, and when the input text is a content-related text not including a predicate, the electronic device may generate an accumulated utterance list including the input text. For example, the electronic device 101 may generate an accumulated utterance list when collecting content-related short utterances, and may identify the number of accumulated utterances from the user's utterance rate. The accumulated number of utterances may show an order of the failed utterances in which a failed utterance made by the largest number of times goes first. The electronic device 101 may compare the generated accumulated utterance list with a pre-stored accumulated utterance list, and in case that a difference between the generated accumulated utterance list and the pre-stored accumulated utterance list is equal to or greater than a threshold ratio, the electronic device may replace the runtime replacement model 1535 by at least one runtime-trained learning model 1510. For example, when the number of accumulated utterances in the pre-stored accumulated utterance list is changed by a predetermined rate (e.g., 10%) or more, the electronic device 101 may replace the runtime replacement model by the runtime-trained learning model 1510 newly learned. As described above, the runtime learning model may be replaced by another runtime learning model continuously learned based on the accumulated utterance list in the future, and thus the real-time speech recognition rate (or execution rate) may be further increased.

Figure 16:
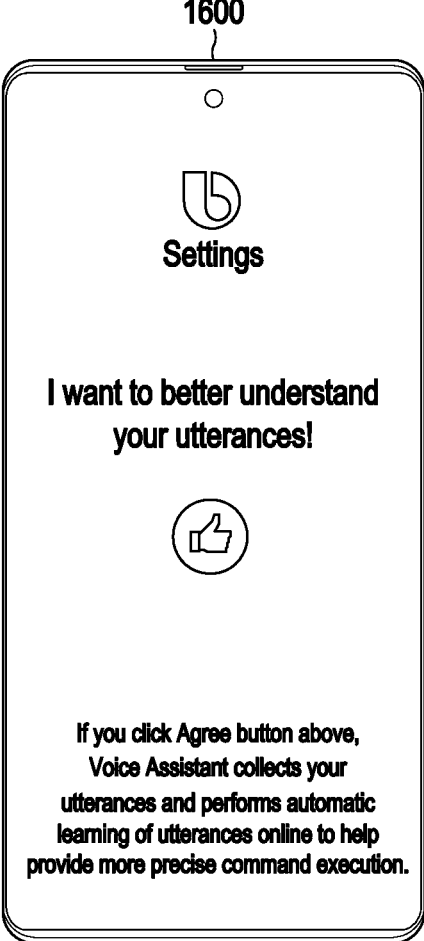
FIG. 16 is an exemplary screen view for user utterance collection according to an embodiment.

FIG. 16 is an exemplary screen view for user utterance collection according to an embodiment.

According to an embodiment, the electronic device 101 may perform speech recognition on a voice input signal received through a microphone according to a user utterance and output the result of speech recognition through a display or speaker. In case that the user's utterance intent is unable to be identified, the electronic device 101 may output a notification about a voice command failure indicating 'unable to execute speech recognition' or 'unable to process' through a display or a speaker. In addition, instead of outputting the notification, the electronic device 101 may output a content that induces the user to input a subsequent voice feedback through a display, or may induce the user to directly input a subsequent voice feedback through an input measure (e.g., a touch screen) other than voice.

In order to use the user's utterance as learning data as described above, user consent may be obtained through a voice assistant setting option displayed on a setting screen 1600 as shown in FIG. 16. According to an embodiment, the electronic device 101 extracts learning data from actual user utterances, and thus utterances that the user wanted to be processed through the voice assistant but are unable to be processed due to lack of learning may be processed through real-time learning. In addition, according to an embodiment, a learning model is trained by considering a short content utterance without a predicate as a learning target and accordingly, even in case that an utterance without a sentence structure is received, the speech recognition rate may be increased when using the trained learning model.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, there may be provided a non-volatile storage medium storing instructions, wherein the instructions are configured to, when executed by a processor (120, 520) of an electronic device (101), cause the electronic device to perform at least one operation, the at least one operation including acquiring utterance data corresponding to a voice of a user through a microphone of the electronic device, acquiring first input text by speech recognition on the utterance data, identifying a named entity from at least part of the first input text, determining an intent corresponding to the voice based on a first intent determination model determined by using the identified named entity, in case that the intent determination has failed, identifying whether the first input text is a text not including a predicate, and generating at least one second intent determination model based on the first input text when the first input text is the text not including a predicate.

The invention claimed is:

1. An electronic device comprising:
   a microphone;
   a processor; and
   memory storing instructions configured to, when executed by the processor, cause the electronic device to:
   acquire utterance data corresponding to a voice of a user through the microphone,
   acquire first input text by speech recognition applied to the utterance data,
   identify a named entity based on the first input text,
   determine, based on the utterance data and using the named entity and a first intent determination model, an intent,
   detect that the intent determination has resulted in a failure,
   responsive to the failure, identify whether a length of the named entity of the utterance data is less than a predetermined length,
   identify the first input text as a text not including a predicate, based on identifying that the length of the named entity of the utterance data is less than the predetermined length, wherein the length is measured in characters or words, and
   generate one or more second intent determination models based on the first input text not including the predicate.

2. The electronic device of claim 1, wherein the instructions are configured to cause the electronic device to:
   identify a category of the named entity, and
   responsive to the failure, determine, based on the category and the length, that the first input text does not include the predicate.

3. The electronic device of claim 2, wherein the instructions are configured to cause the electronic device to:

responsive to the failure, map the category to one or more domains, and generate, based on the first input text, the one or more second intent determination models corresponding respectively to the one or more domains.

4. The electronic device of claim 3, wherein the instructions are configured to cause the electronic device to, responsive to the failure, use a named entity search (NES) to identify the named entity and identify whether the first input text is a content-related text not including the predicate among texts not including the predicate.

5. The electronic device of claim 4, wherein the instructions are configured to cause the electronic device to, responsive to the failure, generate the one or more second intent determination models based on the named entity.

6. The electronic device of claim 5, wherein the instructions are configured to cause the electronic device to:

identify a first domain corresponding to the named entity among the one or more domains, and determine a first intent corresponding to the voice based on the first intent determination model corresponding to the first domain.

7. The electronic device of claim 6, wherein the instructions are configured to cause the electronic device to perform an operation corresponding to the first intent.

8. The electronic device of claim 1, wherein the instructions are configured to cause the electronic device to:

acquire second input text by speech recognition applied to the utterance data, wherein the utterance data is stored in the memory and is associated with the failure, and generate an accumulated utterance list including the second input text, wherein the second input text does not include the predicate.

9. The electronic device of claim 8, wherein the instructions are configured to cause the electronic device to:

compare the accumulated utterance list with a pre-stored accumulated utterance list, and based on a difference between the accumulated utterance list and the pre-stored accumulated utterance list being equal to or greater than a threshold ratio, replace the first intent determination model with a corresponding second intent determination model of the one or more second intent determination models.

10. The electronic device of claim 1, wherein the instructions are configured to cause the electronic device to apply automatic speech recognition (ASR) to the utterance data to acquire the first input text.

11. A method for processing an utterance in an electronic device, the method comprising:

acquiring utterance data corresponding to a voice of a user through a microphone of the electronic device;

acquiring first input text by speech recognition applied to the utterance data;

identifying a named entity based on the first input text;

determining, based on the utterance data and using the named entity and a first intent determination model, an intent;

detecting that the intent determination has resulted in a failure;

responsive to the failure, identifying whether a length of the named entity of the utterance data is less than a predetermined length;

identifying the first input text as a text not including a predicate, based on identifying that the length of the named entity of the utterance data is less than the predetermined length, wherein the length is measured in characters or words; and generating one or more second intent determination models based on the first input text not including the predicate.

12. The method of claim 11, further comprising:

identifying a category of the named entity; and determining, based on the category and the length, that the first input text does not include the predicate.

13. The method of claim 12, further comprising:

responsive to the failure, mapping the category to one or more domains; and generating, based on the first input text, the one or more second intent determination models corresponding respectively to the one or more domains.

14. The method of claim 13, further comprising, responsive to the failure, using a named entity search (NES) to identify the named entity and identifying whether the first input text is a content-related text not including the predicate among texts not including the predicate.

15. The method of claim 14, further comprising, responsive to the failure, generating the one or more second intent determination models based on the named entity.

16. The method of claim 15, further comprising:

identifying a first domain corresponding to the named entity among the one or more domains; and determining a first intent corresponding to the voice based on the first intent determination model corresponding to the first domain.

17. The method of claim 16, further comprising performing an operation corresponding to the first intent.

18. The method of claim 11, further comprising:

acquiring second input text by speech recognition applied to the utterance data, wherein the utterance data is stored in the memory and is associated with the failure; and generating an accumulated utterance list including the second input text, wherein the second input text does not include the predicate.

19. The method of claim 18, wherein the acquiring the first input text comprises applying automatic speech recognition (ASR) on the utterance data to acquire the first input text.

20. A non-transitory storage medium storing instructions, wherein the instructions are configured to, when executed by a processor of an electronic device, cause the electronic device to perform at least one operation, the at least one operation comprising:

acquiring utterance data corresponding to a voice of a user through a microphone of the electronic device;

acquiring first input text by applying speech recognition on the utterance data;

identifying a named entity based on the first input text;

determining, based on the utterance data and using the named entity and a first intent determination model, an intent;

detecting that the intent determination has resulted in a failure;

responsive to the failure, identifying whether a length of the named entity of the utterance data is less than a predetermined length;

identifying the first input text as a text not including a predicate, based on identifying that the length of the named entity of the utterance data is less than the predetermined length, wherein the length is measured in characters or words; and based on the first input text not including the predicate, generating one or more second intent determination models based on the first input text.

* * * * *